United States Patent
Lee et al.

(10) Patent No.: US 9,185,669 B2
(45) Date of Patent: Nov. 10, 2015

(54) SYNCHRONIZATION METHOD FOR DISTRIBUTED ANTENNA SYSTEM AND APPARATUS USING THE SAME

(75) Inventors: Hyun Woo Lee, Anyang-si (KR); Hyuk Min Son, Anyang-si (KR); Hye Young Choi, Anyang-si (KR); Seung Hee Han, Anyang-si (KR); Jin Min Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 13/606,491

(22) Filed: Sep. 7, 2012

(65) Prior Publication Data
US 2013/0242951 A1 Sep. 19, 2013

Related U.S. Application Data
(60) Provisional application No. 61/532,111, filed on Sep. 8, 2011.

(51) Int. Cl.
 H04J 3/00 (2006.01)
 H04W 56/00 (2009.01)
 H04W 52/24 (2009.01)

(52) U.S. Cl.
 CPC ........ *H04W 56/001* (2013.01); *H04W 56/0005* (2013.01); *H04W 56/0015* (2013.01); *H04W 56/0045* (2013.01); *H04W 52/242* (2013.01)

(58) Field of Classification Search
 CPC .......... H04W 52/242; H04W 56/0005; H04W 56/001; H04W 56/0045; H04B 7/0469; H04B 7/0626; H04L 25/03343
 USPC .................................................. 370/328–329
 See application file for complete search history.

(56) References Cited

U.S. PATENT DOCUMENTS

| | | | | |
|---|---|---|---|---|
| 2009/0252075 A1* | 10/2009 | Ji | ........................... | H04W 56/00 370/312 |
| 2010/0136992 A1* | 6/2010 | Harada et al. | .................. | 455/450 |
| 2010/0278132 A1* | 11/2010 | Palanki | ................ | H04B 1/7107 370/329 |
| 2011/0026626 A1* | 2/2011 | Sahlin | ............... | H04W 56/0005 375/260 |
| 2012/0039330 A1* | 2/2012 | Baldemair | ......... | H04W 56/0015 370/350 |
| 2012/0134275 A1* | 5/2012 | Choi | ...................... | H04L 5/0057 370/241 |
| 2012/0189074 A1* | 7/2012 | Jin | .......................... | H04B 7/024 375/267 |
| 2012/0281554 A1* | 11/2012 | Gao | ....................... | H04W 48/12 370/252 |
| 2012/0281555 A1* | 11/2012 | Gao | ....................... | H04L 1/0031 370/252 |
| 2012/0281640 A1* | 11/2012 | Xu | ......................... | H04L 5/0048 370/329 |
| 2012/0307704 A1* | 12/2012 | Roman | ................ | H04W 56/004 370/312 |
| 2013/0028180 A1* | 1/2013 | Gao | ..................... | H04W 74/004 370/328 |
| 2013/0029657 A1* | 1/2013 | Gao | ..................... | H04W 74/004 455/422.1 |
| 2014/0140314 A1* | 5/2014 | Wei et al. | ....................... | 370/329 |
| 2014/0141830 A1* | 5/2014 | Skov | ..................... | H04W 52/10 455/522 |

* cited by examiner

*Primary Examiner* — Asad Nawaz
*Assistant Examiner* — Berhanu Belete
(74) *Attorney, Agent, or Firm* — Lee, Hong, Degerman, Kang & Waimey

(57) ABSTRACT

A method for uplink synchronization in a distributed antenna system is provided. A user equipment determines a transmission offset based on a transmission point for uplink synchronization, allocates uplink synchronization signal to a second communication channel based on the transmission offset, and transmits the uplink transmission signal to the transmission point for uplink synchronization through the second communication channel.

12 Claims, 18 Drawing Sheets

SYNCHRONIZATION METHOD FOR DISTRIBUTED ANTENNA SYSTEM AND APPARATUS USING THE SAME

CROSS-REFERENCE TO RELATED APPLICATIONS

Pursuant to 35 U.S.C. 119(e), this application claims the benefit of U.S. Provisional Patent Application No. 61/532,111, filed on Sep. 8, 2011, the contents of which are hereby incorporated by reference herein in their entirety.

BACKGROUND OF THE INVENTION

1. Field of the Invention

The present invention relates to wireless communication. More particularly, the present invention relates to a method for uplink and/or downlink synchronization in distributed antenna systems and an apparatus using the same.

2. Discussion of the Related Art

The next generation wireless communication system under active research aims a system capable of transmitting various kinds of information such as video and wireless data, being evolved from the initial system providing voice-oriented services. The fourth-generation wireless communication currently under development subsequent to the third-generation wireless communication aims to support high speed data transmission with 1 Gbps (gigabits per second) data rate in the downlink and 500 Mbps (megabits per second) in the uplink. The main objective of wireless communication system is to provide a plurality of users with reliable communication means independent of their location and mobility. However, any wireless communication channel always reveals non-ideal characteristics such as path loss, noise, fading due to multipath, inter-symbol interference (ISI), or Doppler effect due to mobility of a terminal. Various technologies are under development to overcome non-ideal characteristics of wireless communication channels and improve reliability thereof.

Meanwhile, data capacity for cellular wireless systems is ever increasing according to the introduction of M2M (machine-to-machine) communication; and the advent and deployment of various devices such as smart phones and tablet PCs. Various technologies are under development to meet the needs for high data capacity. For example, carrier aggregation (CA) technology and cognitive radio (CR) technology are good examples of an effort to utilize frequency bandwidth more efficiently. Also, multi-antenna technology, multi-base station collaboration technology, etc. to increase data capacity within limited frequency bandwidth are being studied. In other words, it might be the case that wireless communication systems will eventually evolve in such a way to increase node density around the user. A wireless communication system with high node density has chances of improving its performance still more through collaboration among nodes. In other words, a wireless communication system in which nodes are collaborating with each other provides much more excellent performance than the wireless communication system where each node operates as an independent base station (BS), advanced BS (ABS), Node-B (NB), eNode-B (eNB), or access point (AP).

To improve performance of a wireless communication system, applied may be a distributed multi-node system (DMNS) which is equipped with a plurality of nodes within a cell. A distributed multi-node system may include a distributed antenna system (DAS), a radio remote head (RRH), and so on. Also, under progress is a standardization effort for applying various multi-input multi-output (MIMO) techniques and collaborative communication techniques already developed or which can be applied in the future.

A distributed antenna system (DAS) refers to a system where antennas are distributed at various locations across a cell and the antennas are managed by a single base station. Meanwhile, antennas of a base station are concentrated at the center of the cell in case of the conventional centralized antenna system (CAS).

A distributed antenna system distinguishes from a femto cell/pico cell, a relay station, and an ad-hoc system. In the distributed antenna system, coverage area of each antenna is controlled by a central base station, not by the corresponding antenna itself. In this sense, the distributed antenna system is different from a femto cell or a pico cell where individual antennas form a separate network. The distributed antenna system is also different from a relay station or an ad-hoc system in that antennas can be connected through wire to each other. In addition, the distributed antenna system is distinguished from a simple repeater in that each antenna can send signals different from each other according to a command from a base station.

The purpose of the initial distributed antenna system was to transmit a signal repeatedly by installing more antennas inside a cell to achieve coverage in a radio-shaded area. In other words, securing coverage was the main purpose of the initial distributed antenna system. From a macroscopic point of view, however, a distributed antenna system may be regarded a kind of MIMO (multiple input multiple output) system in that antennas may transmit or receive a plurality of data streams simultaneously, thus being able to support one or several users. It is understood that the MIMO system satisfies technical requirements for the next-generation wireless communication due to high spectral efficiency. In view of MIMO system, a distributed antenna system provides more advantages than a centralized antenna system. For example, as distance between the user and the antenna is reduced, power efficiency is increased and high channel capacity due to low correlation and interference between antennas is achieved and communication of relatively uniform quality is secured irrespective of location of the user within a cell. In other words, a distributed antenna system providing advantages described above is suitable for implementing MIMO transmission to secure high data capacity demanded by the current and the future communication specifications.

For example, it may be necessary to perform rank-2 transmission or more for a single user equipment (UE) in the same frequency domain, which is called single user MIMO (SU-MIMO) transmission. In some situations, multi-user MIMO (MU-MIMO) transmission supporting multiple user equipment at the same time may be necessary. The necessity described above may be raised not only for the downlink but also for the uplink.

The SU-MIMO and MU-MIMO communication described in detail above are dealt with in the standard developing organizations such as the IEEE (Institute of Electrical and Electronics Engineers) 802 and the 3GPP (3rd Generation Partnership Project) LTE (Long Term Evolution) as essential topics; in practice, they are dealt with in the IEEE 802.16e/m and the 3GPP LTE release. 8/9. However, current communication specifications have been designed based on centralized antenna systems; therefore, it is difficult to apply the current communication specifications directly to distributed antenna systems incorporating advanced technology such as the MIMO technology. Due to this reason, needed are communication specifications supporting distributed antenna systems; needed are an uplink and/or downlink synchronization method which can be provided to the communication specifications and user equipment operating according to the method.

SUMMARY OF THE INVENTION

An object of the present invention is to provide a method for improving efficiency of transmitting and receiving data in a distributed antenna system and user equipment using the method.

An object of the present invention is to provide an uplink and/or downlink synchronization method in a distributed antenna system and user equipment operating according to the method.

In an aspect, a method for downlink synchronization in a distributed antenna system is provided. A base station determines a transmission offset based on a transmission point to which a downlink synchronization signal is transmitted, allocates the downlink synchronization signal to a first communication channel based on the transmission offset, and transmits the downlink synchronization signal to a user equipment through the first communication channel.

In an aspect, a method for uplink synchronization in a distributed antenna system is provided. A user equipment determines a transmission offset based on a transmission point for uplink synchronization, allocates uplink synchronization signal to a second communication channel based on the transmission offset, and transmits the uplink transmission signal to the transmission point for uplink synchronization through the second communication channel.

In an aspect, a user equipment in a distributed antenna system is provided. A user equipment includes a RF (Radio Frequency) unit transmitting and receiving radio signals and a processor connected to the RF unit. The processor determines a transmission offset based on a transmission point for uplink synchronization, allocates a uplink synchronization signal to a second communication channel based on the transmission offset, and transmits the uplink synchronization signal to the transmission point for uplink synchronization through the second communication channel.

DETAILED DESCRIPTION OF THE INVENTION

The technology described below can be used for various multiple access schemes including CDMA (Code Division Multiple Access), FDMA (Frequency Division Multiple Access), TDMA (Time Division Multiple Access), OFDMA (Orthogonal Frequency Division Multiple Access) and SC-FDMA (Single Carrier-Frequency Division Multiple Access). CDMA can be implemented by using such radio technology as UTRA (Universal Terrestrial Radio Access) or CDMA2000. TDMA can be implemented by using such radio technology as GSM (Global System for Mobile communications)/GPRS (General Packet Radio Service)/EDGE (Enhanced Data Rates for GSM Evolution). OFDMA can be realized by using such radio technology as the IEEE 802.11 (Wi-Fi), IEEE 802.16 (WiMAX), IEEE 802.20, and E-UTRA (Evolved UTRA). UTRA is part of specifications for UMTS (Universal Mobile Telecommunications System). The 3GPP LTE is part of E-UMTS (Evolved UMTS) using E-UTRA, which uses OFDMA radio access for the downlink and SC-FDMA on the uplink. The LTE-A (Advanced) is an evolved version of the LTE.

In what follows, for the purpose of convenience, it is assumed that descriptions are given based on the LTE-A, but the technical principles of the present invention are not limited by the assumption.

Figure 1:
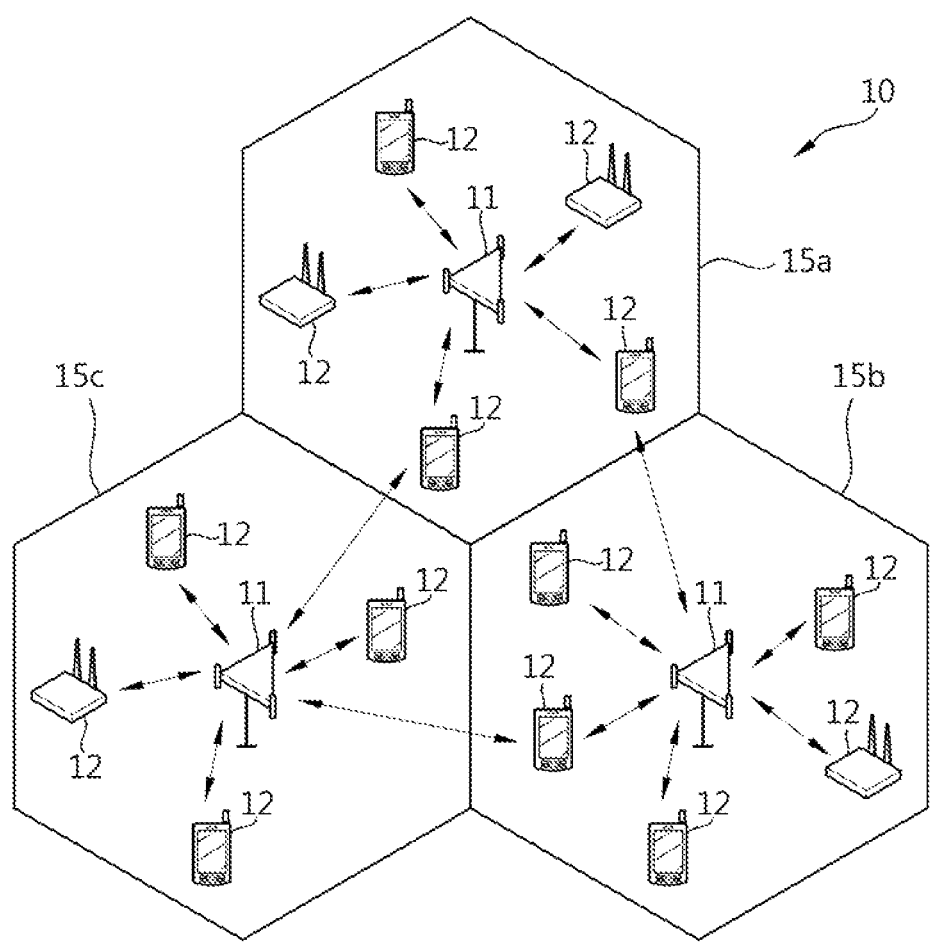
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE: 12) may be fixed or mobile and called in different terms such as a wireless device, a mobile station (MS), a user terminal (UT), a subscriber station (SS), a personal digital assistant (PDA), a wireless modem, or a handheld device. A base station 11 usually refers to a fixed station communicating with a user equipment 12, which is called in different terms such as an evolved-NodeB (eNB), a base transceiver system (BTS), or an access point.

In what follows, the downlink (DL) refers to a communication link from a base station to a user equipment while the uplink (UL) from the user equipment to the base station. In the DL, a transmitter may be a part of the BS while a receiver a part of the UE. In the UL, a transmitter may be a part of the UE while a receiver part of the BS.

Figure 2:
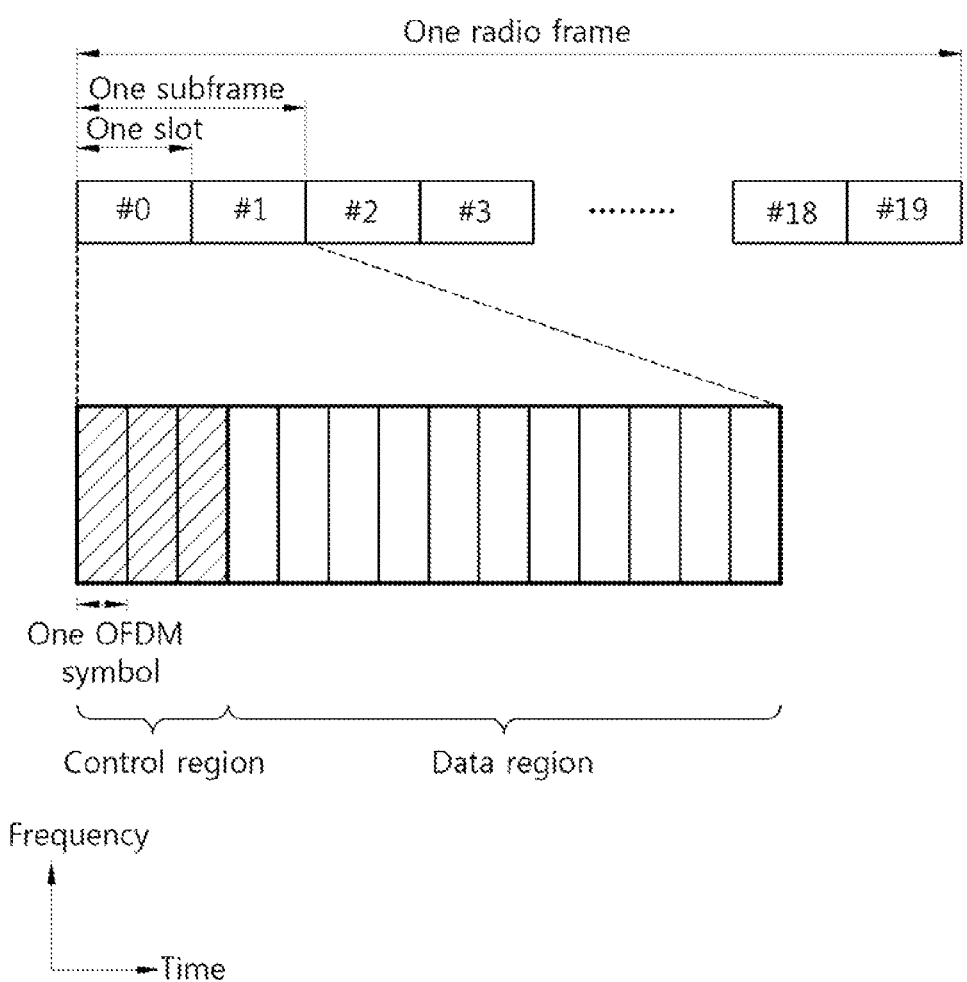
FIG. 2 illustrates the structure of a downlink radio frame in the 3GPP LTE-A.

FIG. 2 illustrates the structure of a downlink radio frame in the 3GPP LTE-A. The section 6 of the 3GPP TS 36.211 V10.2.0 (2011 June) "Evolved Universal Terrestrial Radio Access (E-UTRA); Physical Channels and Modulation (Release 10)" may be incorporated herein by reference.

A radio frame consists of 10 subframes indexed with 0 to 9. One subframe consists of two consecutive slots. A time required for transmitting one subframe is defined as a transmission time interval (TTI). For example, one subframe may have a length of 1 ms and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be called in different terms such as a single carrier frequency division multiple access (SCFDMA) symbol, a symbol period, etc.

Although it is described that one slot includes 7 OFDM symbols for example, the number of OFDM symbols included in one slot may vary depending on a length of a cyclic prefix (CP). According to the 3GPP TS 36.211 V8.5.0 (2008 December), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A DL subframe is divided into a control region and a data region in the time domain. The control region includes up to four preceding OFDM symbols of a 1st slot in the subframe. The number of OFDM symbols included in the control region may vary. A Physical Downlink Control Channel (PDCCH) and other control channel are allocated to the control region, and a PDSCH is allocated to the data region.

A UL subframe is divided into a control region to which a Physical Uplink Control Channel (PUCCH) carrying uplink control information in the frequency domain is allocated and a data region to which a Physical Uplink Shared Channel (PUSCH) carrying user data is allocated.

In what follows, a DL control channel will be described.

As disclosed in the 3GPP TS 36.211 V10.2.0, the 3GPP LTE/LTE-A defines a physical channel, including a Physical Downlink Control Channel (PDCCH), a Physical Control Format Indicator Channel (PCFICH), and a Physical Hybrid-ARQ Indicator Channel (PHICH). Also, control signals transmitted from a physical layer include a Primary Synchronization Signal (PSS), a Secondary Synchronization Signal (SSS), and a random access preamble.

The PSS is carried by the last OFDM symbol of a first slot (first slot of a first subframe (subframe with index 0)) and the 11th slot (first slot of a sixth subframe (subframe with index 5)). The PSS is used for obtaining OFDM symbol synchronization or slot synchronization, and associated with a physical cell identify (ID). A Primary Synchronization Code (PSC) is a sequence used for the PSS and the 3GPP LTE defines three PSCs. According to the cell ID, one from among the three PSCs is transmitted to the PSS. The same PSC is used for each of the last OFDM symbols of the first and the $11^{th}$ slot.

The SSS is divided into a first and a second SSS. The first and the second SSS are carried by an OFDM symbol adjacent to the OFDM symbol carrying the PSS. The SSS is used for obtaining frame synchronization. The SSS is used for obtaining cell ID together with the PSS. The first and the second SSS use Secondary Synchronization Codes (SSCs) different from each other. In case the first and the second SSS carry 31 sub-carriers respectively, two SSC sequences of length 31 are used for the first and the second SSS, respectively.

The PCFICH carried by the first OFDM symbol of a subframe carries control format indicator (CFI) which indicates the number of OFDM symbols (namely, size of the control region) used for carrying control channels within a subframe. The UE first receives the CFI through the PCFICH and monitors the PDCCH.

Different from the PDCCH, the PCFICH does not use blind decoding but transmitted through the fixed PCFICH resources of a subframe.

The PHICH carries ACK (positive acknowledgement)/ NACK (negative acknowledgement) signal for UL hybrid automatic repeat request (HARQ). The ACK/NACK signal about the UL data on the PUSCH transmitted by the UE is transmitted through the PHICH.

A Physical Broadcast Channel (PBCH) is carried by four preceding OFDM symbols of a second slot of a first subframe of the radio frame. The PBCH carries system information essential for the UE to communicate with the BS, where the system information carried through the PBCH is called master information block (MIB). Meanwhile, the system information carried through the PDSCH specified by the PDCCH is called system information block (SIB).

Control information transmitted through PDCCH is called downlink control information (DCI). DCI may include resource allocation of PDSCH (which is also called DL grant), resource allocation of PUSCH (which is called uplink grant), and activation of a set of transmission power control commands for individual UEs within a UE group and/or VoIP (Voice over Internet Protocol).

The 3GPP LTE/LTE-A uses blind decoding for detection of the PDCCH. The blind decoding de-masks an identifier of interest to the CRC of the PDCCH received (which is called a candidate PDCCH) and checks CRC error to confirm whether the corresponding PDCCH is the control channel meant for the blind decoding or not.

The BS determines the PDCCH format according to the DCI to be sent to the UE and attaches Cyclic Redundancy Check (CRC) to the DCI and masks a unique identifier (which is called Radio Network Temporary Identifier (RNTI)) to the CRC according to the owner of the PDCCH or intended use.

The control region within a subframe includes a plurality of CCEs (Control Channel Elements). The CCE is a logical allocation unit introduced for providing encoding rate according to the status of a radio channel to the PDCCH, and corresponds to a plurality of resource element groups (REGs). The REG includes a plurality of resource elements. Depending on the relationship between the number of CCEs and encoding rate provided by the CCEs, the format and the number of bits of the PDCCH available are determined.

One REG includes four REs and one CCE includes 9 REGs. To construct one PDCCH, 1, 2, 4, or 8 CCEs may be used, where each element of the set {1, 2, 4, 8} is called CCE aggregation level.

The BS determines the number of CCEs used for transmission of the PDCCH by taking the channel status into account. For example, a UE in a good DL channel status may utilize one CCE for PDCCH transmission. A UE in a poor DL channel status may utilize 8 CCEs for PDCCH transmission.

A control channel consisting of one or more CCEs performs interleaving in units of REGs, and is mapped to physical resources after cyclic shift based on the cell ID is performed.

Figure 3:
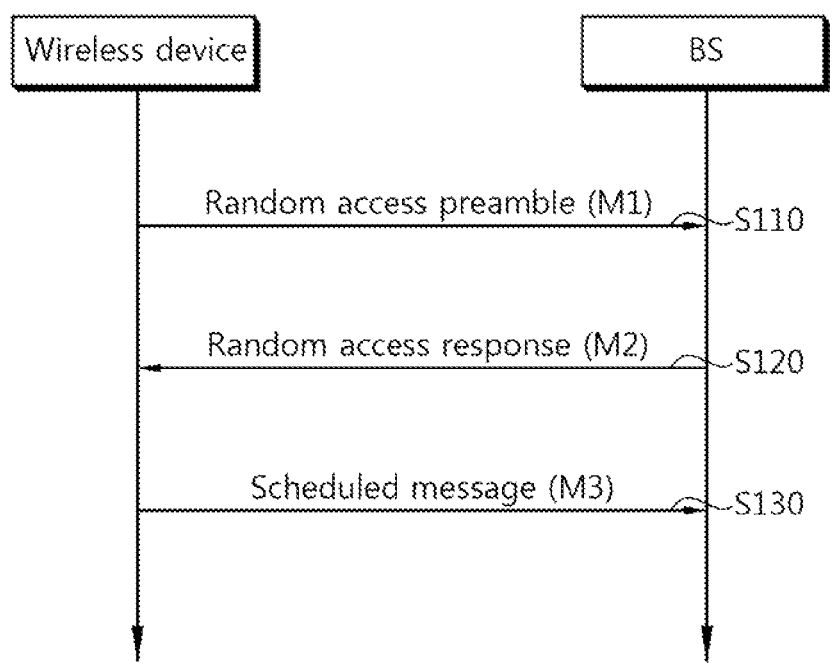
FIG. 3 is a flow diagram illustrating a random access procedure in the 3GPP LTE/LTE-A.

FIG. 3 is a flow diagram illustrating a random access procedure in the 3GPP LTE/LTE-A.

The UE receives from the BS a root index and a physical random access channel (PRACH) configuration index. Each cell has 64 candidate random access preambles defined by a Zadoff-Chu (ZC) sequence and the root index is a logical index for the UE to generate 64 candidate random access preambles.

Transmission of the random access preamble for each cell is limited by particular temporal and spectral resources. The PRACH configuration index specifies a particular subframe and a preamble format capable of transmitting the random access preamble.

The table below is one example of random access configuration disclosed in Section 5.7 of the 3GPP TS 36.211 V8.7.0 (2009 May).

TABLE 1

| PRACH configuration index | Preamble format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The UE transmits the random access preamble selected in a random fashion to the BS S110. The UE selects one from among 64 candidate random access preambles. And the UE selects the corresponding subframe based on the PRACH configuration index. The UE transmits the selected random access preamble from the selected subframe.

The BS receiving the random access preamble sends a random access response (RAR) to the UR S120. The random access response is detected in two steps. First, the UE detects a masked PDCCH by using random access-RNTI (RA-RNTI). Then, the UE receives the random access response within the MAC (Medium Access Control) PDU (Protocol Data Unit) through the PDSCH specified by a DL grant on the detected PDCCH.

Now, a reference signal will be described.

A reference signal (RS) is usually transmitted in the form of a sequence. A reference signal sequence may employ a random sequence without being limited by particular conditions. The reference signal sequence may employ a PSK (Phase Shift Keying)-based computer generated sequence. Examples of the PSK include binary phase shift keying (BPSK), quadrature phase shift keying (QPSK), and so on. Similarly, the reference signal sequence may employ constant amplitude zero auto-correlation (CAZAC) sequence. Examples of the CAZAC sequence include Zadoff-Chu (ZC)-based sequence, ZC sequence with cyclic extension, ZC sequence with truncation, and so on. Meanwhile, the reference signal sequence may employ a pseudo-random (PN) sequence. Examples of the PN sequence include m-sequence, computer-generated sequence, gold sequence, Kasami sequence, and so on. Also, the reference signal sequence may employ a cyclically shifted sequence.

A DL reference signal can be classified into a cell-specific RS (CRS), multimedia broadcast and multicast single frequency network (MBSFN) RS, UE-specific RS, positioning RS (PRS), and channel state information (CSI) RS. The CRS is an RS transmitted to all the UEs within a cell, which can be used for channel measurement about channel quality indicator (CQI) feedback and channel estimation about the PDSCH. The MBSFN RS can be transmitted from a subframe allocated for MBSFN transmission. The UE-specific RS is an RS received by a particular UE or a particular UE group within a cell, which may be called a demodulation RS (DMRS). The DMRS is mostly used for a particular UE or a particular UE group to perform data demodulation. The PRS may be used for position estimation of the UE. CSI-RS is used for channel estimation for the PDSCH of the LTE-A UE. The CSI-RS is disposed in a relatively sparse fashion in the spectral or temporal region, and can be punctured in a general subframe or data region of the MBSFN subframe. In case of need for estimating CSI, the UE may report CQI, PMI, RI, etc.

The CRS is transmitted from all the DL subframes within a cell supporting PDSCH transmission. The CRS can be transmitted through the antenna port 0 to 3, and the CRS may be defined only for $\Delta f=15$ kHz. The CSI-RS may refer to the Section 6.10.1 of the 3GPP (3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)".

Figure 4:
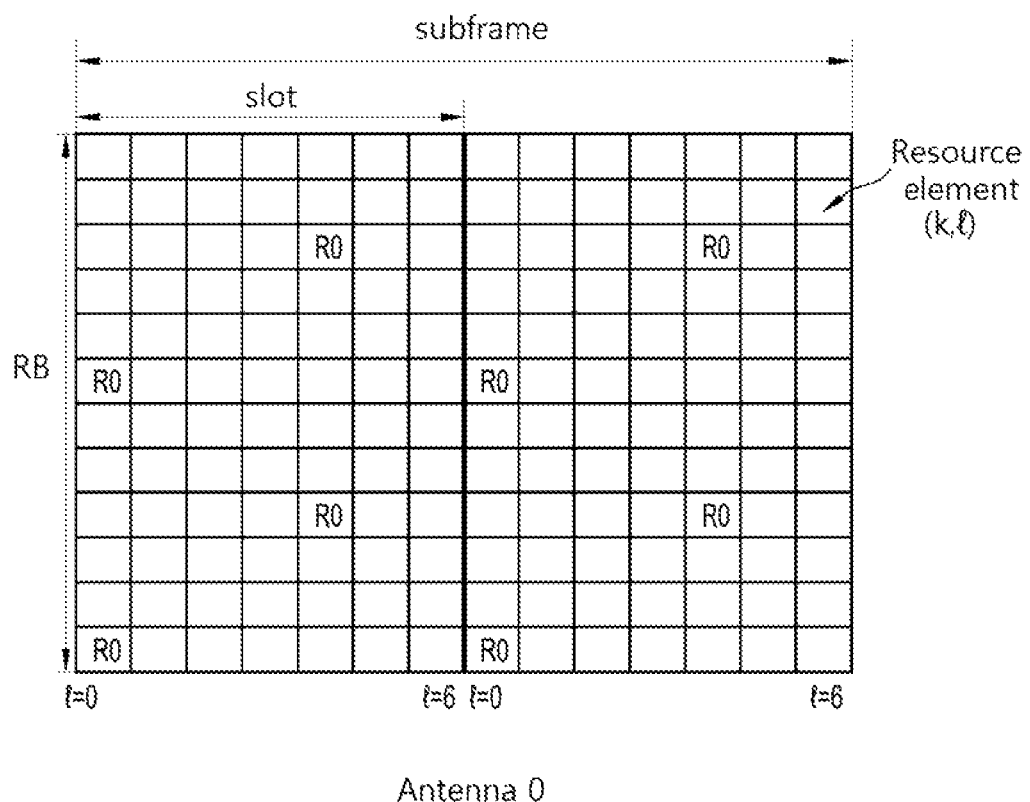
FIGS. 4 to 6 illustrate one example of an RB on which a CRS is mapped.
Figure 5:
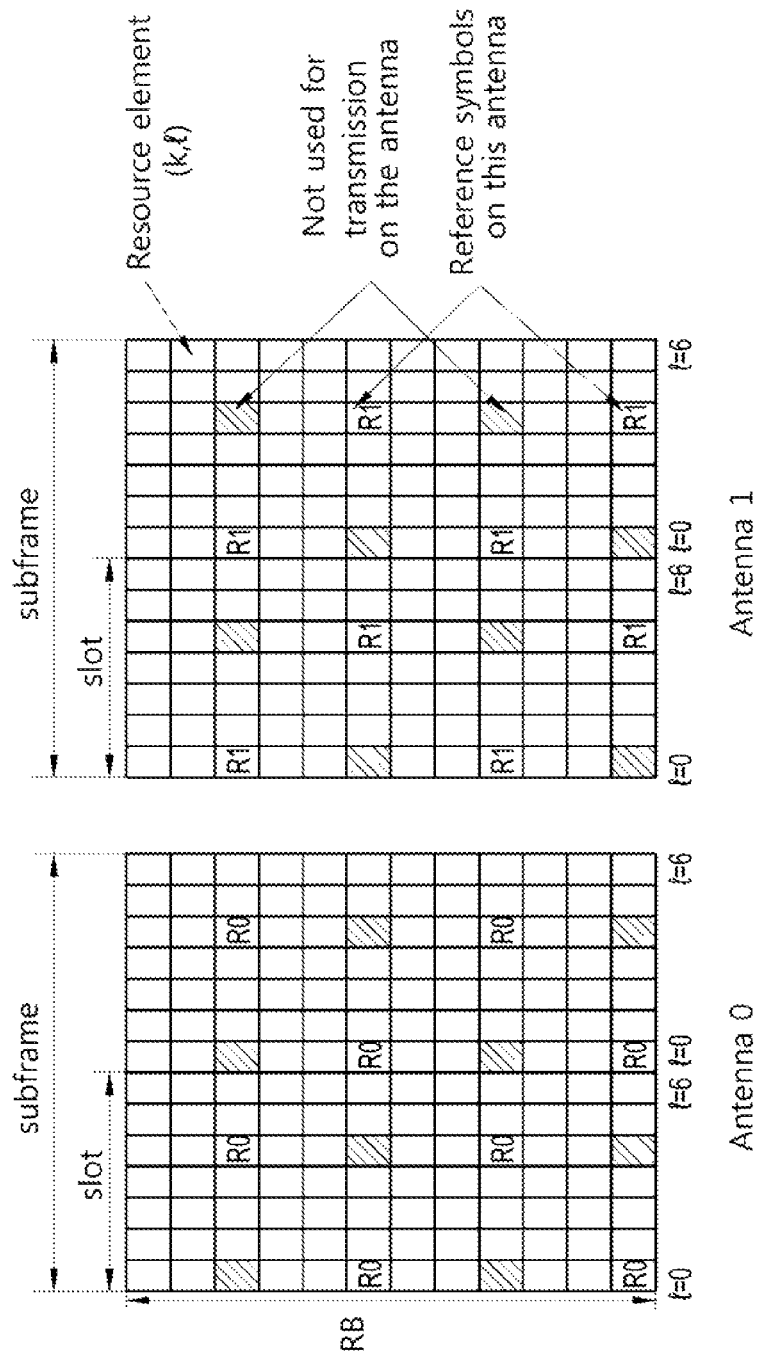
Figure 6:
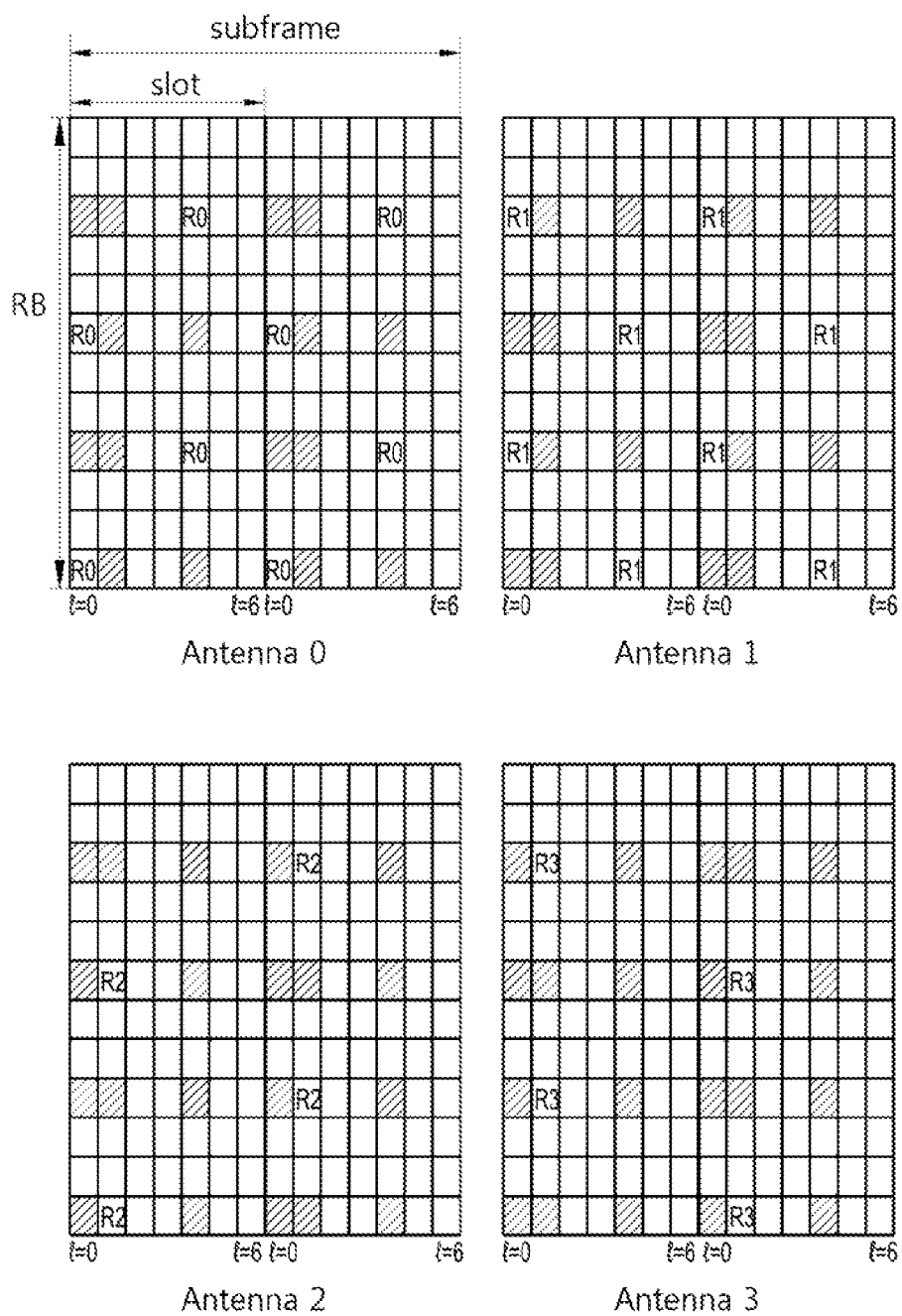

FIGS. 4 to 6 illustrate one example of an RB on which a CRS is mapped.

FIG. 4 is one example of a pattern in which the CRS is mapped onto the RB in case the BS uses a single antenna port; FIG. 5 for the case where the BS uses two antenna ports; FIG. 6 for the case where the BS uses four antenna ports. Also, the CRS pattern may be used for supporting the characteristics of the LTE-A. For example, the CRS pattern may be used for supporting the characteristics such as coordinated multi-point (CoMP) transmission and reception method; or spatial multiplexing. Also, the CRS may be used for channel quality measurement, CP detection, time/frequency synchronization, etc.

With reference to FIGS. 4 to 6, in case of multi-antenna transmission where the BS uses a plurality of antenna ports, one resource grid is allocated to each antenna port. 'R0' denotes a RS for a first antenna port; 'R1" for a second antenna port; 'R2' for a third antenna port; and 'R3' for a fourth antenna port. Positions of R0 to R3 within a subframe do not overlap with each other. l is the position of the OFDM symbol within a slot, whose value ranges from 0 to 6 for a normal CP. The RS for each antenna port in one OFDM symbol is placed at interval of six sub-carriers. The number of R0 within the subframe is the same as the number of R1 and the number of R2 and the number of R3 are the same to each other. The number of R2 and R2 within the sub-frame is less than the number of R0 and R1. A resource element used for the RS of one antenna port is not used as an RS for another antenna, which is intended not to cause interference between antenna ports.

As many CRSs as the number of antenna ports are always transmitted irrespective of the number of streams. The CRS has an independent reference signal for each antenna port. The position of the CRS in the frequency and time domain within a subframe is determined independently of the UE. Also, a CRS sequence multiplied to the CRS is generated independently of the UE. Therefore, all the UEs within a cell can receive the CRS. However, the position of the CRS within the subframe and the CRS sequence may be determined according to the cell ID. The position of the CRS in the time domain within the subframe may be determined according to the antenna port number and the number of OFDM symbols within the resource block. The position of the CRS in the frequency domain within the subframe may be determined according to the antenna number, cell ID, OFDM symbol index (l), slot number within a radio frame, and so on.

The CRS sequence may be applied in units of OFDM symbols within one subframe. The CRS sequence may vary depending on the slot number within one radio frame, OFDM symbol index within the slot, type of CP, and so on. The number of RS subcarriers for each antenna port in one OFDM symbol is 2. If it is assumed that a subframe contains $N_{RB}$ resource blocks in the frequency domain, the number of RS subcarriers for each antenna in one OFDM symbol becomes $2\times N_{RB}$. Therefore, length of the CRS sequence becomes $2\times N_{RB}$.

Equation 1 represents one example of a CRS sequence r(m)

$$r(m) = \frac{1}{\sqrt{2}}(1 - 2 \cdot c(2m)) + j\frac{1}{\sqrt{2}}(1 - 2 \cdot (2m + 1)), \quad \langle \text{Equation 1}\rangle$$

where m is 0, 1, ..., $2N_{RB}^{max}-1$. $2N_{RB}^{max}$ is the number of resource blocks corresponding to the maximum bandwidth. For example, $2N_{RB}^{max}$ is 110 in the 3GPP LTE. c(i) is a PN sequence, which is a simulated, random sequence, and can be defined by a gold sequence of length −31. Equation 2 represents one example of the gold sequence c(n).

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad <\text{Equation 2}>$$

where Nc=1600; $x_1(i)$ is a first m-sequence; $x_2(i)$ is a second m-sequence. For example, the first and the second m-sequence may be initialized for each OFDM symbol according to cell ID, slot number within one radio frame, OFDM symbol index within the slot, type of CP, and so on.

In case of a system having bandwidth less than $2N_{RB}^{max}$, only a predetermined part with length of $2\times N_{RB}$ may be selected and used from the RS sequence with length of $2\times 2N_{RB}^{max}$.

Frequency hopping may be applied to the CRS. A frequency hopping pattern may take one radio frame (10 ms) for its period and each frequency hopping pattern corresponds to one cell ID group.

The DMRS is provided for the PDSCH transmission and is transmitted on the antenna port p=5, p=7, 8, or p=7, 8, ..., v+6. At this time, v denotes the number of layers used for the PDSCH transmission. The DMRS is transmitted to one UE through any one of antenna ports belonging to a set S, where S={7, 8, 11, 13} or S={9, 10, 12, 14}. The DMRS exists and is valid for demodulation of the PDSCH only when transmission of the PDSCH is associated with the corresponding antenna port. The DMRS is transmitted only at the RBs to which the corresponding PDSCH is mapped. The DMRS is not transmitted at resource elements through which either a physical channel or a physical signal is transmitted, irrespective of antenna ports. The DMRS may refer to the Section 6.10.3 of the 3GPP (3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)".

Figure 7:
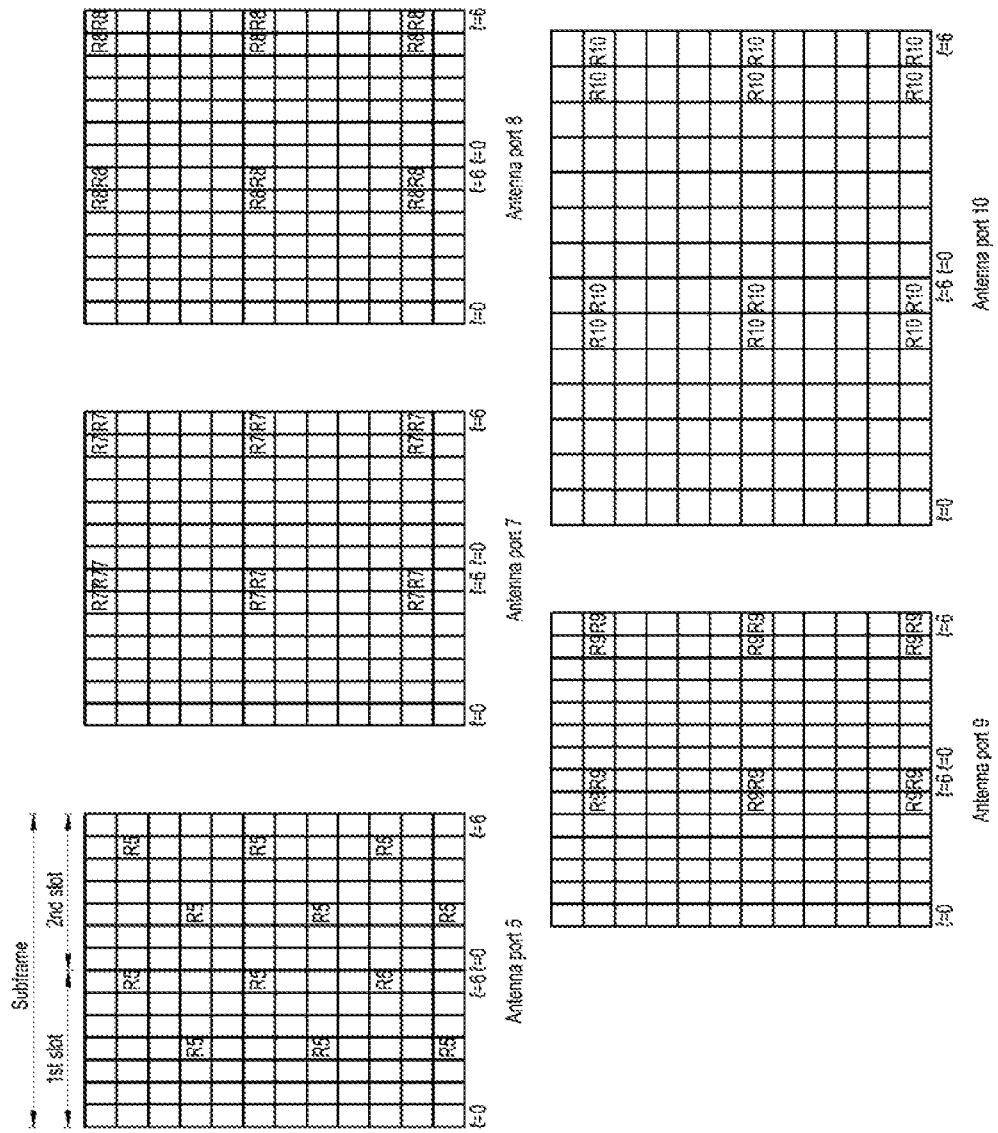
FIG. 7 is one example of an RB to which the DMRS is mapped.

FIG. 7 is one example of an RB to which the DMRS is mapped.

FIG. 7 illustrates resource elements used for the DMRS in the normal CP structure. Rp denotes a resource element used for DMRS transmission through the antenna port p. For example, R5 denotes a resource element to which the DMRS for the antenna port 5 is transmitted. Also, with reference to FIG. 7, the DMRS for the antenna port 7 and 8 is transmitted through the resource element corresponding to a first, sixth, and eleventh subcarrier (subcarrier index 0, 5, 10) of a sixth and seventh OFDM symbol (OFDM symbol index 5, 6) of each slot. The DMRS for the antenna port 7 and 8 can be distinguished by an orthogonal sequence of length 2. The DMRS for the antenna port 9 and 10 is transmitted through the resource element corresponding to a second, seventh, and twelfth subcarrier (subcarrier index 1, 6, 11) of a sixth and seventh OFDM symbol (OFDM symbol index 5, 6) of each slot. The DMRS for the antenna port 9 and 10 can be distinguished by an orthogonal sequence of length 2. Also, since S={7, 8, 11, 13} or S={9, 10, 12, 14}, the DMRS for the antenna port 11 and 13 is mapped to the resource element to which the DMRS for the antenna port 7 and 8 is mapped while the DMRS for the antenna port 12 and 14 is mapped to the resource element to which the DMRS for the antenna port 9 and 10 is mapped.

The CSI-RS is transmitted through 1, 2, 4, or 8 antenna ports. The antenna ports used for this case correspond to p=15, p=15, 16, p=15, ..., 18, and p=15, ..., 22. The CSI-RS can be defined only for $\Delta f$=15 kHz. The CSI-RS may refer to the Section 6.10.3 of the 3GPP (3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)".

For transmission of the CSI-RS, up to 32 different configurations from each other can be employed to reduce inter-cell interference (ICI) in a multi-cell environment as well as a heterogeneous network environment. Configurations for the CSI-RS differ from each other according to the number of antenna ports and CP within a cell; and adjacent cells may assume configurations different from each other as possibly as can be. Also, the CSI-RS configurations can be divided into the cases of being applied to both FDD and TDD frame and only to TDD frame according to frame structure. A plurality of CSI-RS configurations may be used for a single cell. For the UE assuming non-zero transmission power may employ 0 or 1 CSI configuration while the UE assuming zero transmission power may employ 0 or several CSI configurations. The UE does not transmit the CSI-RS for a special subframe of TDD frame; a subframe where transmission of the CSI-RS collides with a synchronization signal, a physical broadcast channel (PBCH), and system information block type 1; or a subframe to which a paging message is transmitted. In addition, in a set S where S={15}, S={15, 16}, S={17, 18}, S={19, 20} or S={21, 22}, the resource element to which the CSI-RS for one antenna port is transmitted is not used for transmission of the CSI-RS for the PDSCH or another antenna port.

Figure 8:
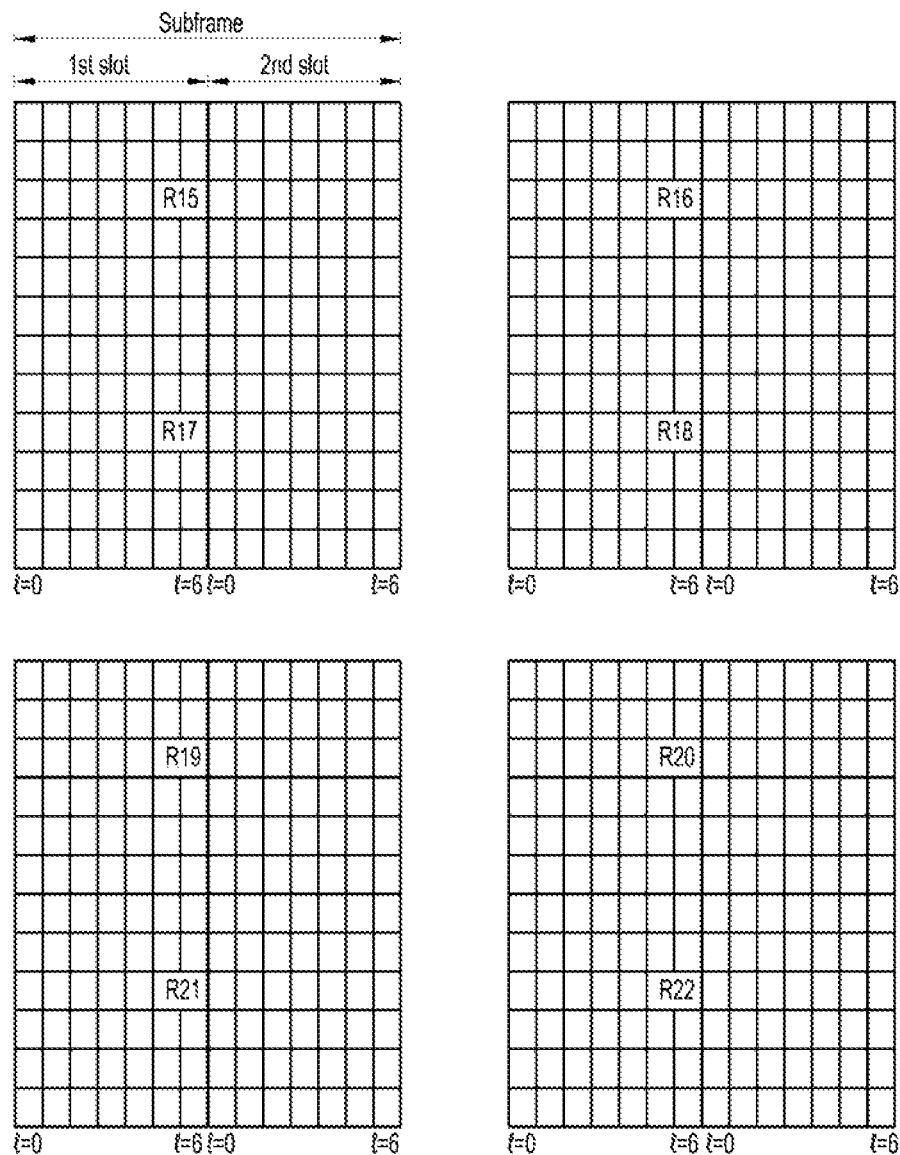
FIG. 8 is one example of an RB to which the CSI-RS is mapped.

FIG. 8 is one example of an RB to which the CSI-RS is mapped.

FIG. 8 illustrates resource elements used for the CSI-RS in the normal CP structure. Rp denotes a resource element used for CSI-RS transmission through the antenna port p. With reference to FIG. 8, the CSI-RS for the antenna port 15 and 16 is transmitted through the resource element corresponding to a third subcarrier (subcarrier index 2) of a sixth and seventh OFDM symbol (OFDM symbol index 5, 6) of a first slot. The CSI-RS for the antenna port 17 and 18 is transmitted through the resource element corresponding to a ninth subcarrier (subcarrier index 8) of a sixth and seventh OFDM symbol (OFDM symbol index 5, 6) of a first slot. The CSI-RS for the antenna port 19 and 20 is transmitted through the same resource element to which the CSI-RS for the antenna port 15 and 16 is transmitted while the CSI-RS for the antenna port 21 and 22 is transmitted through the same resource element to which the CSI-RS for the 17 and 18 is transmitted.

Meanwhile, wireless communication systems can be largely classified into frequency division duplex (FDD) scheme and time division duplex (TDD) scheme. In the FDD scheme, the UL and the DL transmission are carried out while occupying different frequency bands from each other. In the TDD scheme, the UL and the DL transmission occupy the same frequency band but are carried out at different times from each other. Channel response based on the TDD scheme is actually reciprocal, which means that the DL channel response and the UL channel response are virtually the same to each other in a given frequency band. Therefore, wireless communication systems based on the TDD scheme provide an advantage that the DL channel response may be obtained from the UL channel response. Since the TDD scheme performs the UL and the DL transmission by time division of the entire frequency band, the DL transmission by the BS and the UL transmission by the UE cannot be performed simultaneously. In the TDD system where the UL and the DL transmission are distinguished in units of subframes, the UL and the DL transmission are performed in different subframes from each other.

In addition, wireless communication systems can support multiple antennas. In other words, a transmitter can use a plurality of transmit antennas and a receiver can use a plurality of receive antennas. A transmit antenna refers to a physical or logical antenna used for transmitting a signal or a stream while a receive antenna a physical or logical antenna used for receiving a signal or a stream. If a transmitter or a receiver employs a plurality of antennas, the wireless communication system may be called a multiple input multiple output (MIMO) system.

Various transmission techniques can be applied for a MIMO system. The transmission technique refers to the technique by which a BS transmits downlink data to a UE. MIMO transmission techniques include transmit diversity, spatial multiplexing, and beamforming. Transmit diversity is the technology which can transmit same data from multi-transmit antenna to enhance transmission reliability. Spatial multiplexing is the technology which can transmit high speed data without increasing system bandwidth by transmitting disparate data from a multi-transmit antenna. Beamforming is used for increasing SINR (Signal to Interference plus Noise Ratio) of a signal by adding a weight according to channel status. At this time, the weight can be expressed by a weight vector or a weight matrix, which is called a precoding vector or a precoding matrix.

Spatial multiplexing may be applied for a single user or multiple users. Spatial multiplexing for a single user is alternatively called SU-MIMO (Single User MIMO) while spatial multiplexing for multiple users SDMA (Spatial Division Multiple Access) or MU-MIMO (Multi User MIMO).

The MIMO transmission technique can be configured semi-statically by higher layer signaling such as RRC (Radio Resource Control).

Figure 9:
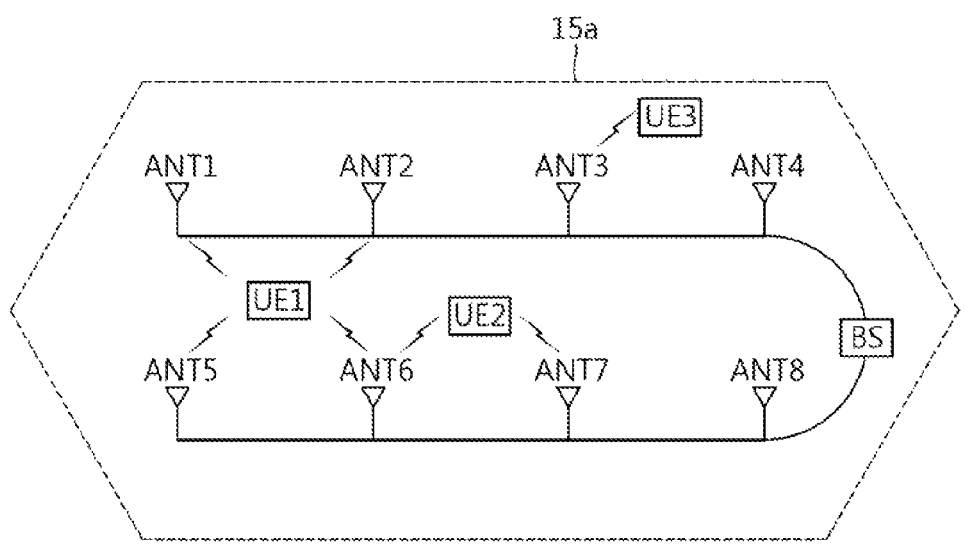
FIG. 9 illustrates a distributed antenna system (DAS).

FIG. 9 illustrates a distributed antenna system (DAS).

With reference to FIG. 9, a distributed antenna system (DAS) comprises a base station (BS) and base station antennas (in this case, ant 1 to ant 8; hereinafter, base station antennas are called antennas). Antennas (ant 1 to ant 8) can be connected to the BS wired or wirelessly. Different from the existing centralized antenna system (CAS), antennas in a distributed antenna system are not concentrated at a particular position of a cell 15a, for example, at the center of the cell, but disposed being distributed at various positions within the cell. Although the example of FIG. 9 assumes antennas are disposed at positions with regularly spaced intervals, the present invention is not limited to the example and several antennas may be disposed at each position to form a cluster.

At this time, antennas may be disposed in such a way that antenna coverage overlaps with each other and thus rank-2 transmission or higher is supported. For example, coverage of each antenna may reach adjacent antennas. In this case, signal strength of a signal received by a user equipment within a cell from a plurality of antennas may vary dynamically depending on the position of the UE within the cell, channel status, and so on. With reference to the example of FIG. 9, UE 1 can receive a signal of good receiving sensitivity from antenna 1, 2, 5, 6. In the meantime, the signal transmitted from antenna 3, 4, 7, 8 may degrade due to path loss and exert a marginal effect on the UE 1.

UE 2 may receive a signal of good receiving sensitivity from antenna 6, 7 while the signal transmitted from the remaining antennas may have a slight effect on the UE 2. In the same way, in case of UE 3, a signal of good receiving sensitivity is received only from antenna 3 and the signal from the remaining antennas may reveal signal strength weak enough to be ignored.

In the distributed antenna system, carrying out MIMO communication may be simple for user equipments separated from each other within a cell. In the above example, the UE 1 may carry out communication through antenna 1, 2, 5, 6 while the UE 2 through antenna 6, 7 and the UE 3 through antenna 3. Antenna 4, 8 may transmit signals for the UE 2 or 3; or antenna 4, 8 may not transmit any signal at all.

In other words, antenna 4, 8 may be operated being turned off depending on situations.

As described above, in case a distributed antenna system carries out SU-MIMO/MU-MIMO communication, each user equipment can have a variety of layers (namely, the number of transport streams). Also, antennas (or antenna group) allocated may be different for each user equipment. In other words, a distributed antenna system can support particular antennas (or a particular antenna group) for each user equipment. Antennas supporting a user equipment may change depending on time.

Meanwhile, the DAS described above has the same form with a part of CoMP (Coordinated Multi-Point) discussed in the LTE-A. The LTE-A system expresses a distributed antenna with a high speed link (e.g., optical cable) to a base station as RRH (Remote Radio Heads). A base station and RRHs are collectively called TP (Transmission Point).

Also, the LTE-A system classifies the CoMP according to four scenarios. In what follows, the scenario 3 refers to the case of "Heterogeneous network with low power RRHs within the macrocell coverage where the transmission/reception points created by the RRHs have different cell IDs as the macro cell" while the scenario 4 "Heterogeneous network with low power RRHs within the macrocell coverage where the transmission/reception points created by the RRHs have the same cell IDs as the macro cell".

Figure 10:
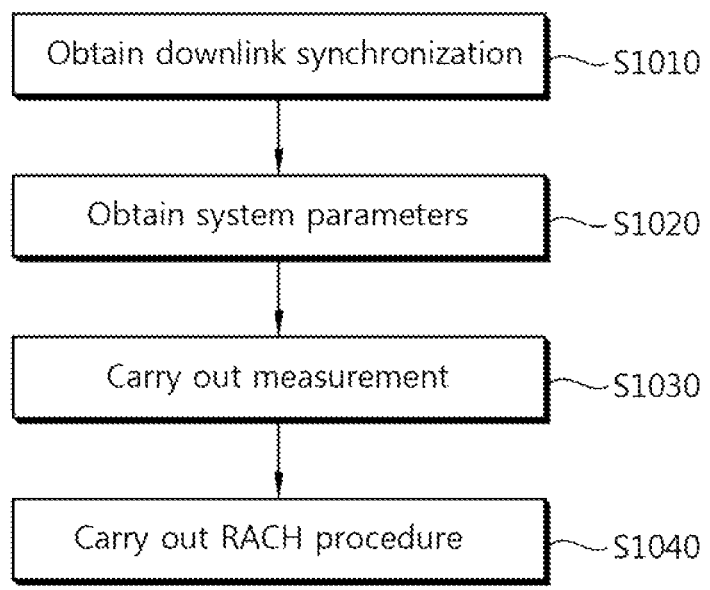
FIG. 10 is a flow diagram illustrating a procedure of a user equipment's attempting an initial connection to a base station.

FIG. 10 is a flow diagram illustrating a procedure of a user equipment's attempting an initial connection to a base station.

A user equipment obtains downlink synchronization by detecting a downlink synchronization signal of a base station S1010. The downlink synchronization signal of the conventional LTE-A system may refer to the 3GPP TS 36.211 V10.2.0, "3rd Generation Partnership Project; Technical Specification Group Radio Access Network; Evolved Universal Terrestrial Radio Access (E-UTRA); Physical Channels and Modulation (Release 10), appearing in the Section 6.11 Synchronization signals of June 2011.

The UE receives a broadcasting channel of the BS and obtains system parameters S1020. At this step, the UE can obtain transmission power of the CRS (Cell-specific Reference Signal) of the BS, RACH (Random Access Channel)-related parameters, and so on.

The UE receives the CRS of the BS and carries out measurement of RSRP (Reference Signal Received Power) and so on S1030. In the above step, path loss can be estimated based on the ratio of received power to transmitted power of the CRS.

The UE carries out RACH procedure for obtaining uplink synchronization S1040. At this time, the UE, by using the path loss estimated at the step of S1030, can estimate the initial power for PRACH (Physical Random Access Channel) preamble transmission.

Meanwhile, when the DAS or the Comp is introduced, a new technique is needed to obtain the downlink/uplink synchronization described above.

Figure 11:
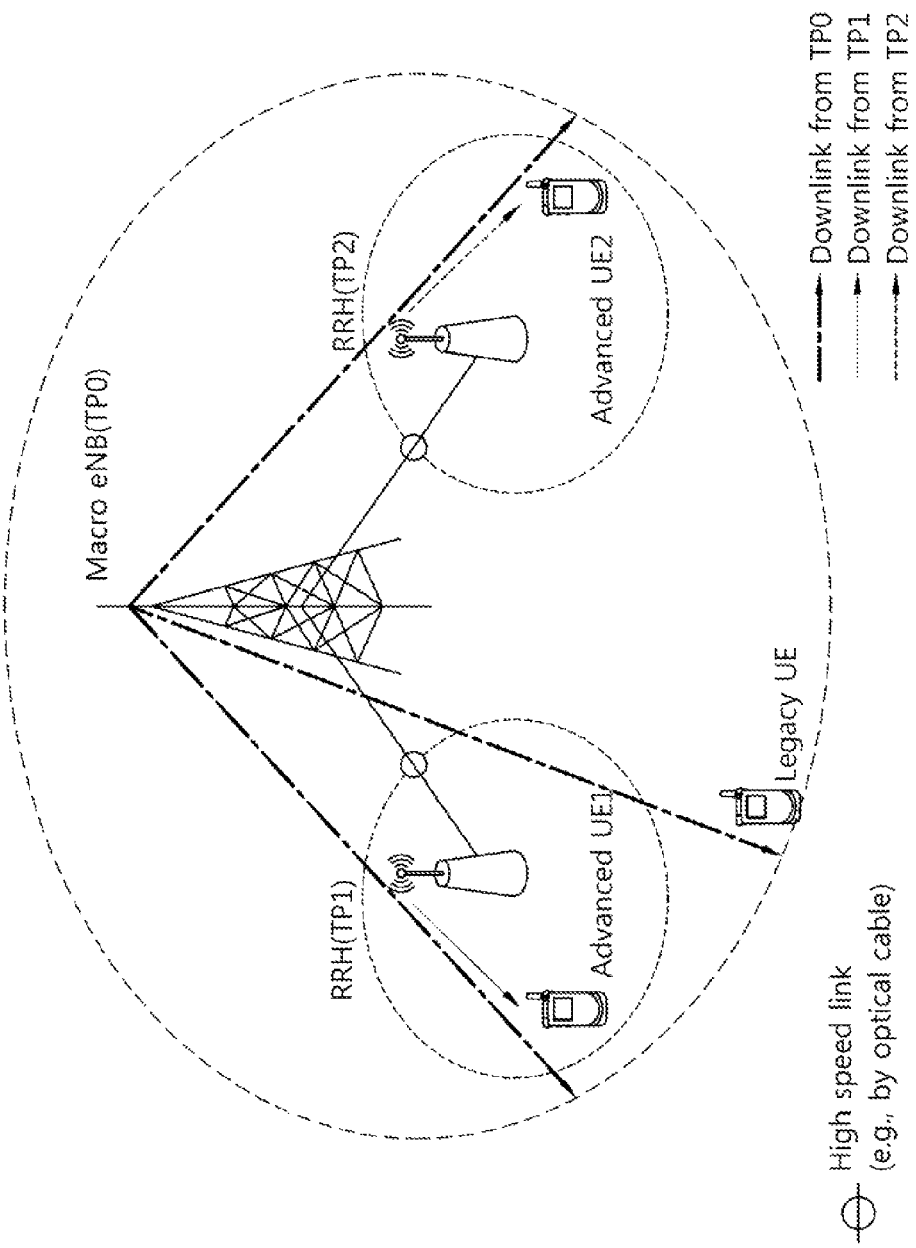
FIG. 11 illustrates an example where downlink interference occurs in the DAS system.

FIG. 11 illustrates an example where downlink interference occurs in the DAS system.

Transmission power of the BS is set to be sufficiently large so that all the UEs within the coverage may receive signals. In general, path loss is proportional to power of 4 of the distance; therefore, the transmission power should be increased in proportion to power of 4 of the distance to compensate the path loss as the coverage is extended.

The BS, for example, macro eNB (TP 0) transmits a signal with transmission power corresponding to the coverage to service user equipments within the coverage. Meanwhile, since RRHs (TP 1, TP 2) only have to service user equipments within a relatively small coverage, small transmission power is required. In other words, the macro eNB (TP 0) uses relatively large downlink transmission power compared with the RRH.

With reference to FIG. 11, the macro eNB (TP 0) uses transmission power large enough for legacy UEs located at the edge of a serving cell to receive signals. Meanwhile, each RRH uses small transmission power to accommodate small coverage. In case the macro eNB and RRH transmit a signal using the same time/frequency resources, since the macro eNB uses large power for transmission of the signal, the signal influences the user equipments positioned within the coverage of the RRH. In other words, the transmit signal of the macro eNB exerts as interference on the UEs positioned within the coverage of the RRH. In the above case, the UEs' performance for detecting a transmit signal of the RRH degrades.

PDSCH, for example, capable of distinguishing time/frequency resources from each other in a UE-specific manner may solve the above problem by avoiding doubly allocating the time/frequency resources among transmission points. However, such signals as SS (Synchronization Signal) and CRS (Common Reference Signal) may be transmitted to and from transmission points at the same position of time-frequency domain. Therefore, a method for preventing interference between a base station and individual RRHs in the distributed antenna system (DAS) is needed. In particular, when the base station and RRHs, namely various transmission points transmit the same SS and CRS by using the same cell ID and the UE receives the signals, a resulting effect due to interference may get significant. Furthermore, the UE gets to unable to know which transmission point the signal originates from.

Figure 12:
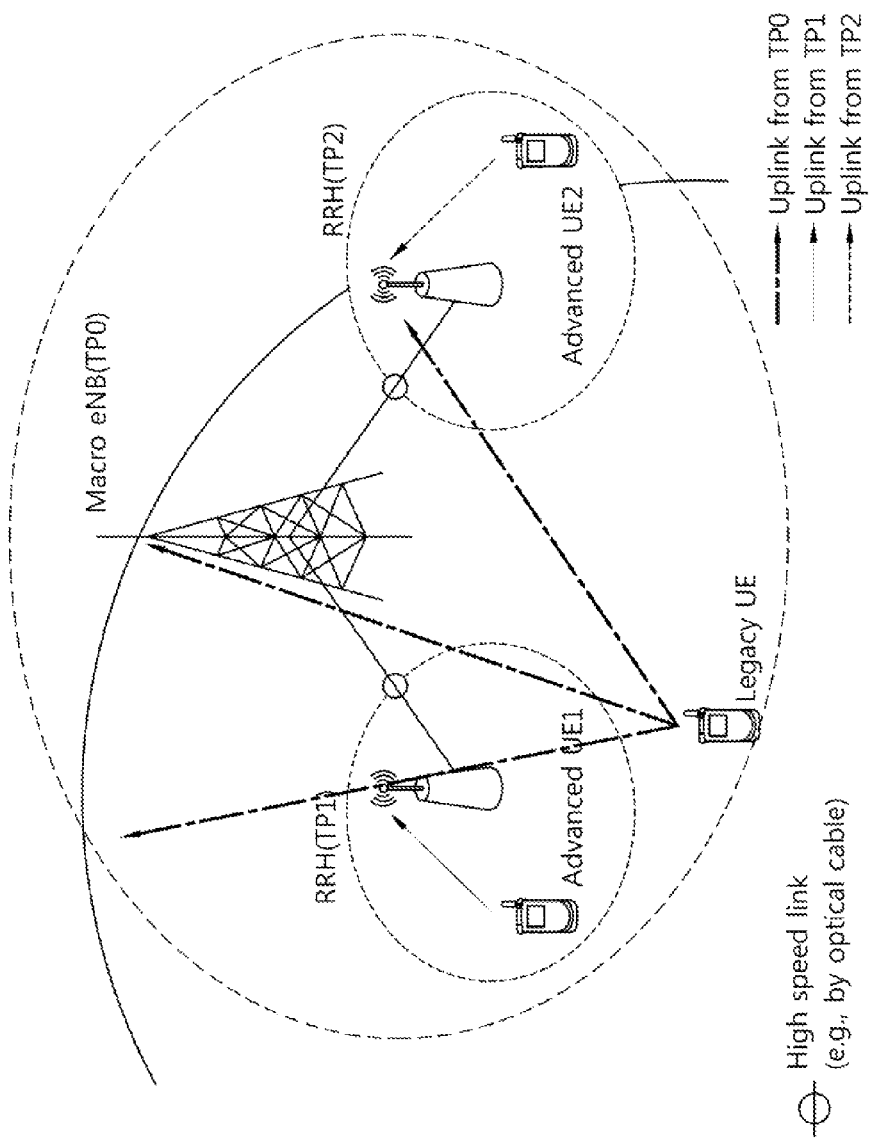
FIG. 12 illustrates an example where uplink interference occurs in the DAS system.

FIG. 12 illustrates an example where uplink interference occurs in the DAS system.

In the LTE Rel-10 system, the user equipment receives a CRS transmitted through an antenna port 0 of the base station in a cell to which the UE is downlink synchronized and estimates path loss by using transmission power of the CRS. The transmission power of the UE is determined so that it can compensate the path loss. As described above, since path loss generally increases in proportion to power of 4 of distance, transmission power of the UE has to be increased in proportion to power of 4 of the distance between the UE and the BS.

In the example of FIG. 12, a legacy UE performs transmission by taking a macro eNB (transmission point 0) as a receive transmission point while advanced UE 1 and 2 performs transmission by taking RRH (TP 1) and RRH (TP 2) as receive transmission points, respectively. The legacy UE uses large transmission power to carrying out transmission to a relatively distant macro eNB (transmission point 0). Meanwhile, the advanced UE 1 and 2 may use small transmission power since they perform transmission to relatively near RRH (TP 1) and RRH (TP 2). At this time, since the transmit antenna of the UE performs omnidirectional transmission without directivity, a transmit signal of the legacy UE utilizing large transmission power may have influence on the RRH. In other words, a transmit signal of a legacy UE using relatively large power may affect the transmit signal of the advanced UE 1 and 2 using small power or other receive signals in the form of interference. The same problem may happen between RRHs.

In case of PUSCH (Physical Uplink Shared Channel) where time/frequency resources are differentiated in a UE-specific manner, the above problem can be solved by excluding double allocation of time/frequency resources among transmission points. However, a particular signal may be transmitted among transmission points at the same position in the time-frequency domain. For example, in case the BS and the RRH employ PRACH time/frequency configuration utilizing the same time-frequency domain according to CoMP scenario 3 or 4, transmission of PRACH preamble by the legacy UE may affect the transmission of PRACH preamble by the advanced UE in the form of interference. In other words, when signals are transmitted from various user equipments, a resulting effect due to interference may become significant. Moreover, the BS gets to unable to know which user equipment a receive signal originates from.

Therefore, needed is a method for preventing interference between 'legacy UE and advanced UE' or 'advanced UEs' in the DAS system as described above.

In what follows, described will be a method for configuring/transmitting downlink/uplink synchronization channels and a procedure thereof.

First, a downlink synchronization signal and (primary) broadcasting channel are described. Subsequent descriptions can be applied to downlink transmission. In particular, the descriptions can be applied to transmission of cell common signals such as the downlink synchronization signal (SS) and broadcasting channel (BCH). In the following, for the purpose of convenience, SS is chosen as an example for the description.

As in the example of FIG. 11, when the macro eNB and RRHs transmit SS or (primary) BCH by using the same time/frequency resources, interference is developed for each other. As one embodiment to solve this problem, a transmission time/frequency offset for the signal and/or channel may be applied among the macro eNB and RRHs.

Figure 13:
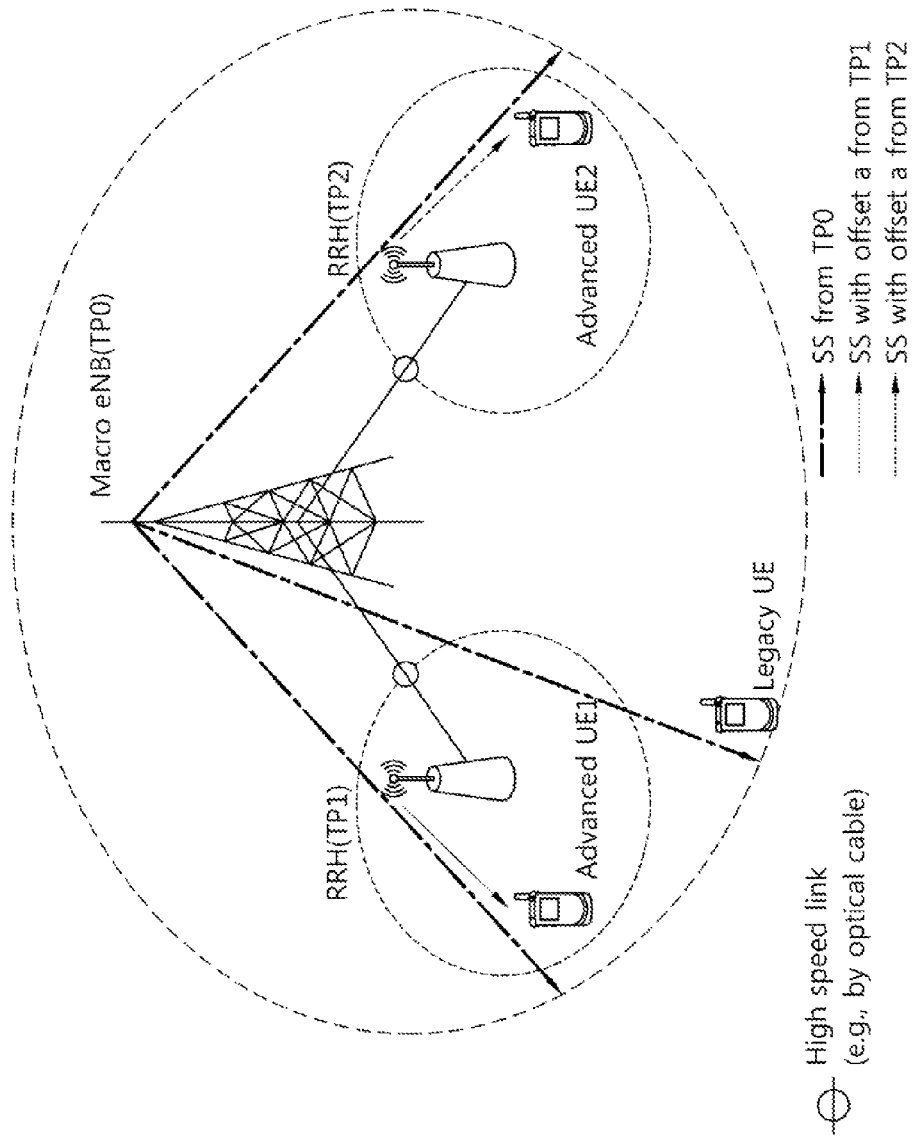
FIG. 13 is one example illustrating a case where SS to which a transmission offset has been applied is transmitted.

FIG. 13 is one example illustrating a case where SS to which a transmission offset has been applied is transmitted.

With reference to FIG. 13, the SS is transmitted between a macro eNB and RRHs with a transmission offset (or timing shift) being applied to the SS. According to the method above, SSs between the macro eNB and RRHs can be made not to overlap. The transmission offset (or timing shift) can be a subframe offset, symbol offset, or frame offset. Transmission offsets (or timing shifts) of two different values can be applied separately to each of the macro eNB and RRH. Similarly, different transmission offsets (or timing shifts) may be used for the respective RRHs.

For example, in case a subframe offset is applied, the SS is transmitted from slot 0 and 10 within a frame structure type 1 (FFD) frame. In other words, all the subframes do not transmit the SS. Therefore, in case an SS to which a subframe offset (or subframe shift) has been applied is transmitted between the macro eNB and RRHs, interference between them can be prevented. With reference to FIG. 13, the macro eNB (transmission point 0) and RRHs (TP 1, TP 2) transmit the SS. However, with respect to the time at which the macro eNB transmits the SS, RRH (TP 1) transmits the SS by applying a transmission offset of a while RRH (TP 2) transmits the SS by applying a transmission offset of b. In case transmission offsets (or timing shifts) are applied separately to each of the macro eNB and RRH, a and b are set to the same value. Therefore, SSs transmitted from various transmission points occupy the region not overlapping with each other for the respective UEs. According to the method described above, interference among the SSs can be prevented. Also, the advanced UE can obtain synchronization directly from a particular transmission point (e.g., RRH).

Meanwhile, as one different embodiment for preventing interference, only one particular transmission point (e.g., macro eNB) may transmit the SS whereas other transmission points (e.g., RRHs) may not transmit the SS. In other words, even if a plurality of transmission points exist within a cell, since only one transmission point transmits the SS, interference is not developed.

Figure 14:
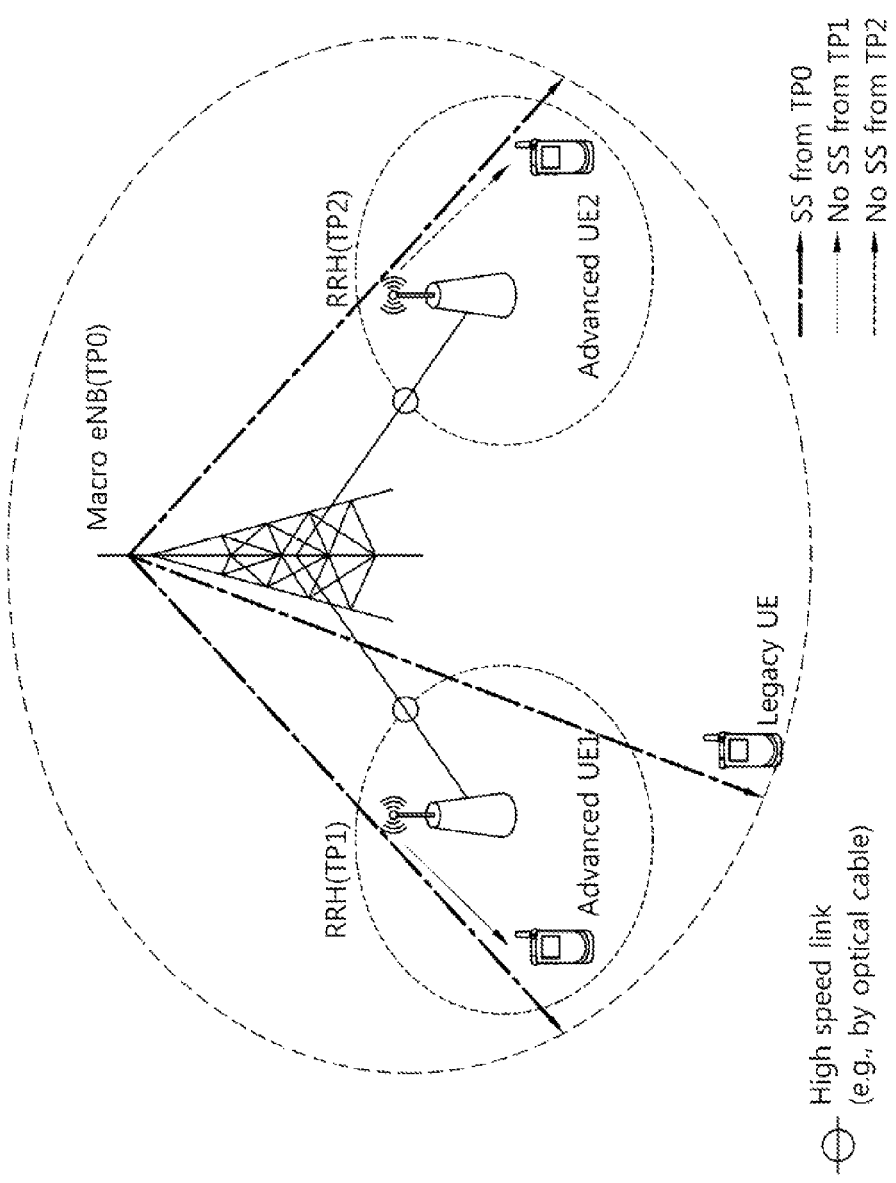
FIG. 14 is one example illustrating a case where RRHs do not transmit SSs.

FIG. 14 is one example illustrating a case where RRHs do not transmit SSs.

The UE, at the time of initial access, obtains downlink synchronization by using the SS transmitted from a single transmission point (e.g., macro eNB). Afterwards, depending on the situations, the UE can obtain synchronization for another transmission point (e.g., RRHs) by using a different signal (e.g., CRS, CSI-RS). Since RRH has relatively small cell coverage, there may be little difference between downlink synchronization and timing of the macro eNB. In particular, in case the transmission timing of RRH is determined while the RRH receives a downlink signal, namely, when the downlink transmission timing at the RRH is adjusted based on the transmission timing of the macro eNB, the timing of the RRH may not show much difference from the downlink synchronization of the macro eNB. Therefore, by incorporating a minor timing difference such as timing update into the timing of the macro eNB already obtained, synchronization of the RRH can be realized.

In what follows, a measurement method (for random access) will be described.

According to the LTE Rel-10 specifications, at the time of carrying out the RACH procedure for obtaining initial uplink synchronization, transmission power of the initial PRACH preamble is determined based on the measurement of the CRS transmitted through antenna port 0. Also, in the CoMP setting, the CRS can be configured in such a way that it can be transmitted only from a particular transmission point (e.g., macro eNB) or it can be transmitted from all the transmission points.

In case the CRS is transmitted from all the transmission points (through antenna port 0), a legacy UE determines initial transmission power by carrying out path loss estimation based on the CRS. In this case, CRSs transmitted from all the transmission points may work as interference on the CRSs themselves. Therefore, the legacy UE may wrongly determine the initial transmission power due to the interference.

In case the CRS is transmitted (through antenna port 0) only from a particular transmission point (e.g., macro eNB), the legacy UE determines the initial transmission power by carrying out path loss estimation based on the CRS transmitted from the particular transmission point.

In case the CRS is transmitted (through antenna port 0) from all the transmission points and measurement is carried out based on the CRS, the advanced UE determines the initial transmission power by carrying out path loss estimation based on the CRS. In this case, CRSs transmitted from all the transmission points may work as interference on the CRSs themselves. Therefore, the legacy UE may wrongly determine the initial transmission power due to the interference.

In case the CRS is transmitted (through antenna port 0) only from a particular transmission point (e.g., macro eNB) and measurement is carried out based on the CRS, the advanced UE determines the initial transmission power by carrying out path loss estimation based on the CRS transmitted from the particular transmission point. In the above case, path loss estimation for the closest transmission point cannot be carried out.

In case the CSI-RS is transmitted from transmission points different from each other through antenna ports different from each other and measurement is carried out based on the CSI-RS, the advanced UE, by carrying out path loss estimation based on the CSI-RS transmitted from a particular transmission point, can determine the initial transmission power about the particular transmission point.

In what follows, uplink random access channel will be described.

As described in detail above, interference between the macro eNB and RRHs may develop during uplink transmission in the same time/frequency resources. In particular, due to uplink transmission of a legacy UE using relatively large transmission power, a transmission signal of the advanced UE within coverage of the RRHs may not be detected or detection performance may be degraded.

To be more specific, described will be a method for obtaining uplink synchronization about a particular transmission point in the CoMP setting.

In one embodiment of obtaining uplink synchronization about a particular transmission point in the CoMP setting, initial PRACH transmission power of all the user equipments can be determined by using the same method as applied to legacy UEs. In other words, the initial PRACH transmission power of the advanced UE is determined by using the same method for the legacy UE. (It should be noted that measurement afterwards may employ CSI-RS rather than CRS.)

In case of CoMP scenario 4, RHs use the same cell ID as the macro eNB. Also, the RRHs can have the same broadcasting information. Therefore, PRACH resources for obtaining uplink synchronization may not be distinguished. In other words, a PRACH resource set may not be distinguished within the coverage of the macro eNB. In the above case, as shown in the example of FIG. 12, transmission of PRACH preamble by the legacy UE (through the CRS) may work as serious interference on the transmission of PRACH preamble of the advanced UE within RRH coverage (through CSI-RS).

Therefore, as described above, according to one embodiment of the present invention, all the UEs within a cell, namely, legacy UE and advanced UE determine the initial transmission power for PRACH by using the same method as applied for the legacy UE. In other words, at the time of transmission of PRACH preamble, all the UEs within a cell determines the initial PRACH power based on the CRS transmitted through antenna port 0. As a result, all the UEs within the cell get to perform the same procedure of determining transmission power. The macro eNB transmits the CRS through antenna port 0 whereas RRHs do not transmit the CRS. Individual RRHs can transmit the CSI-RS through the respective antenna ports. At this time, downlink synchronization may be synchronized to the macro eNB or a nearby transmission point.

Meanwhile, as a different embodiment of obtaining uplink synchronization about a particular transmission point in the CoMP setting, different frequency PRACH or different time PRACH may be allocated for each transmission point.

As described above, in case of CoMP scenario 4, RRHs use the same cell ID as macro eNB. Also, the RRHs can have the same broadcasting information. Therefore, PRACH resources for obtaining uplink synchronization may not be distinguished from each other. In other words, one PRACH resource set may not be distinguished within the coverage of the macro eNB. In this case, as shown in the example of FIG. 12, transmission of PRACH preamble of a legacy UE (through CRS) may work as serious interference on the transmission of PRACH preamble of the advanced UE within RRH coverage (through CSI-RS).

Therefore, as described in detail above, according to one embodiment of the present invention, PRACH resources for a legacy UE (or macro eNB) and PRACH resources for an advanced UE (or RRH) are used separately. In other words, PRACH resources distinguishable in the time or frequency domain are allocated and used between the macro eNB and RRHs.

Allocation of PRACH preamble resources may refer to the Section 5.7 of the 3GPP TS 36.211 V10.2.0 (2011 June) "Evolved Universal Terrestrial Radio Access (E-UTRA); Physical Channels and Modulation (Release 10)".

For example, in case of frame structure type 1 (FDD), time domain of PRACH resources is allocated based on 'Table 5.7.1-2: Frame structure type 1 random access configuration for preamble formats 0-3'. Frequency domain is allocated based on $n_{PRBoffset}^{RA}$ configured by higher layers. For one subframe, a maximum of one PRACH resources can be configured and time period can be configured to be 1 ms at minimum for all the subframes.

For example, in case of frame structure type 2 (TDD), time/frequency domain of PRACH resources is allocated based on 'Table 5.7.1-3: Frame structure type 2 random access configuration for preamble formats 0-4' and 'Table 5.7.1-4: Frame structure type 2 random access preamble mapping in time and frequency'. Frequency domain is allocated based on $n_{PRBoffset}^{RA}$ configured by higher layers. For one subframe, one or more, up to six PRACH resources can be configured and the PRACH resources can be allocated to all the uplink subframes.

RAR (Random Access Response), which is a response to the transmission of PRACH preamble, can be distinguished based on the RA-RNTI and the preamble code index detected within a message. In other words, a user equipment which has transmitted a particular PRACH preamble by using particular time/frequency resources can receive RAR including RA-RNTI derived from the particular time/frequency resources and determine whether the RAR is the response to the UE itself based on the PRACH preamble index within a received RAR message. Therefore, combinations of the RA-RNTI and preamble index have to be distinguishable from each other.

Equation 3 illustrates one example of RA-RNTI.

$$RA\text{-}RNTI = 1 + t\_id + 10 * f\_id, \qquad \text{<Equation 3>}$$

where t_id is the index of the first subframe of the specified PRACH (0≤t_id <10), and f_id is the index of the specified PRACH within that subframe, in ascending order of frequency domain (0≤f_id<6).

Meanwhile, although PRACH resources of macro eNB and RRHs can be utilized separately in the time domain, it is impossible to allocate PRACH resources of the macro eNB and RRHs separately in the time domain when PRACH is allocated to all the subframes in the FDD scheme or PRACH is allocated across all the UL subframes in the TDD scheme. In this case, PRACH resource distinguished among macro eNB and RRHs in frequency domain may be used.

In order to distinguish PRACH resources of the macro eNB and RRHs in the frequency domain, additional $n_{PRBoffset}^{RA}$ may be specified through PHY/MAC/RRC signaling. For example, it can be so configured that the PRACH source transmitted through the existing SIB is used for the macro eNB (or antenna port 0) while $n_{PRBoffset}^{RA}$ for RRH (or another antenna port) is specified through additional signaling. The $n_{PRBoffset}^{RA}$ value can be specified for each of the RRHs (or antenna ports) within a cell; or it can be specified as a single value applied commonly for all the RRHs (or antenna ports).

In a similar way, in order to use PRACH resources of the macro eNB and RRHs separately in the frequency domain, an offset for $n_{PRBoffset}^{RA}$ can be specified through PHY/MAC/RRC signaling. In other words, an offset can be specified for $n_{PRBoffset}^{RA}$ which is the PRACH resources transmitted through the existing SIB. For example, PRACH source transmitted through the existing SIB can be used for the macro eNB (or antenna port 0) and an additional offset α can be used for the RRH (or antenna port). Otherwise stated, the PRACH resource of the RRH (or antenna port) can be allocated based on $n_{PRBoffset}^{RA} + \alpha$. At this time, the offset α can have a different value for the individual RRH (or antenna port). The $n_{PRBoffset}^{RA} + \alpha$ value can be specified for each of the RRHs (or antenna ports) within a cell; or a single value can be specified commonly for all the RRHs (or antenna ports).

According to the method described above, since f_id which determines the RA-RNTI differs from each other, distinguishing PRACH resources is made possible. However, in case a maximum value of f_id is 5 in a particular TDD configuration, namely, if, for example, 6 resource blocks are allocated in the frequency domain, f_id cannot be applied. However, using the method above does not cause a problem for almost all configurations; for the case causing a problem, which is described in the 'Table 5.7.1-4: Frame structure type 2 random access preamble mapping in time and frequency', the problem can be solved by prohibiting the above method in a particular CoMP scenario (e.g., scenario 4).

Meanwhile, as still another embodiment of obtaining uplink synchronization about a particular transmission point in the CoMP setting, a system can be so configured to perform 2 step initial random access in a particular CoMP setting (e.g., scenario 4).

Figure 15:
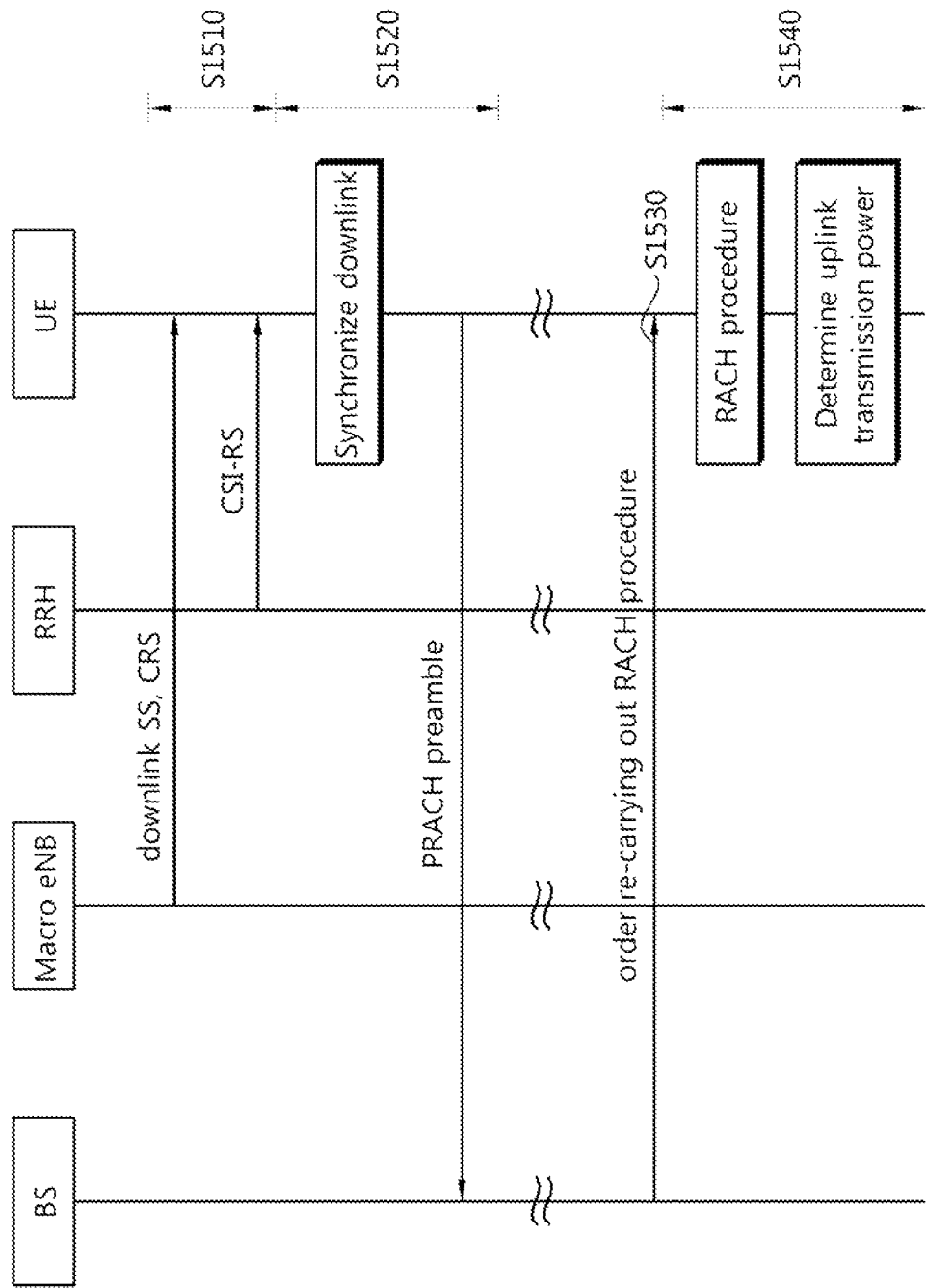
FIG. 15 is a flow diagram illustrating 2 step initial random access.

FIG. 15 is a flow diagram illustrating 2 step initial random access.

The macro eNB (e.g., antenna port 0) transmits downlink SS and CRS. RRH (e.g., antenna port which is not 0) does not transmit downlink SS and CRS. Instead, the BS can transmit CSI-RS distinguishable for each RRH (or antenna port) for measurement of advanced UEs within RRH coverage S1510.

The UE, after downlink synchronization, determines PRACH initial power through the CRS and transmits PRACH preamble by using the power determined. In other words, the legacy UE and advanced UE determine transmit PRACH preamble after determining PRACH initial power by using the same method S1520.

Afterwards, for CoMP communication, the BS orders the (advanced) UE which needs to obtain uplink synchronization to other transmission points to perform the RACH procedure again S1530. The order from the BS above may be issued after the RACH procedure is completed or along with a completion message; still, the order can be included in the RAR so that the RACH procedure can be started again from the transmission point side. In addition, the order can be issued through a PDCCH order.

At this time, the BS may determine a particular transmission point or the UE can determine the particular transmission point based on measurement. For example, the UE can measure transmission power of the CSI-RS transmitted from transmission points and determine a transmission point with the smallest path loss as the particular transmission point.

At this time, the PRACH resources for the particular transmission point have to be differentiated from the existing PRACH resources for macro eNB in the time or frequency domain. To this purpose, the method for configuring resources described above can be applied.

At this time, the initial transmission power for transmission of PRACH preamble meant for a particular transmission point must not be determined based on the CRS but determined again based on the CSI-RS transmitted from the particular transmission point.

The UE which has completed the RACH procedure for a particular transmission point can obtain uplink transmission timing about the particular transmission point and determine uplink transmission power through the initial transmission power determined based on the CSI-RS and adjustment through the RACH procedure S1540.

By using the method above, a system capable of preventing interference from the legacy UE on the advanced UE; and obtaining and adjusting uplink transmission timing of the advanced UE for a particular transmission point can be realized.

Figure 16:
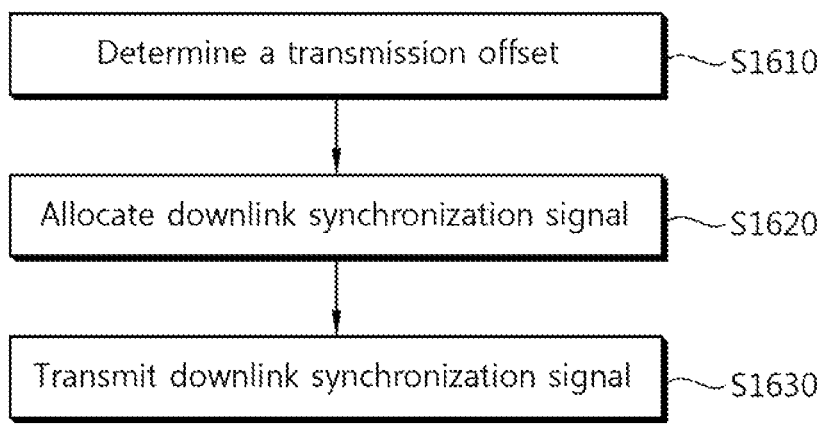
FIG. 16 is a flow diagram illustrating a downlink synchronization method due to a base station in a distributed antenna system according to one embodiment of the present invention.

FIG. 16 is a flow diagram illustrating a downlink synchronization method due to a base station in a distributed antenna system according to one embodiment of the present invention.

With reference to FIG. 16, the BS determines a transmission timing offset based on a transmission point to which a downlink synchronization signal is transmitted S1610. The transmission point refers to the macro eNB or RRH controlled by the BS. Also, the transmission point includes at least one or more antenna ports. For example, the macro eNB can include antenna port 0. The antenna port 0 of the macro eNB can be used as a reference to other antenna ports. Therefore, the antenna port 0 can be used as a reference to determine a transmission timing offset.

The BS allocates the downlink synchronization signal to a first communication channel based on the transmission timing offset determined S1620. The BS transmits the downlink synchronization signal to the UE through the first communication channel S1630. In other words, the first communication channel is used for transmission of the downlink synchronization signal. For example, the first communication channel may correspond to the PBCH in the LTE-A system.

Figure 17:
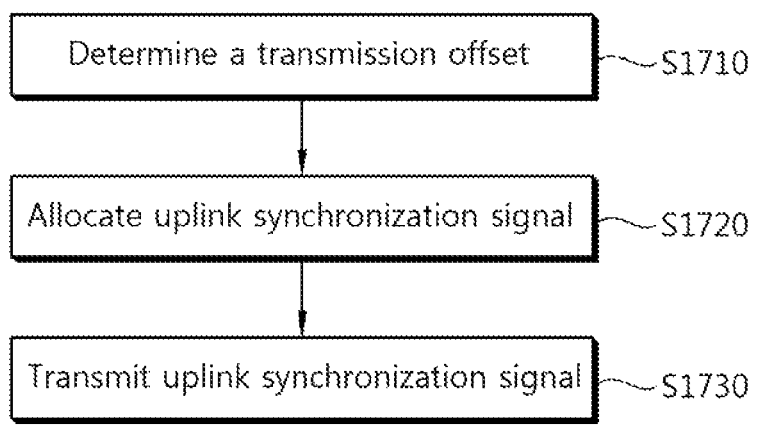
FIG. 17 is a flow diagram illustrating an uplink synchronization method by the UE in a distributed antenna system according to one embodiment of the present invention.

FIG. 17 is a flow diagram illustrating an uplink synchronization method by the UE in a distributed antenna system according to one embodiment of the present invention.

With reference to FIG. 17, the UE determines a transmission offset based on a transmission point for uplink synchronization S1710. The transmission point for uplink synchronization is the transmission point which is a target of uplink synchronization by the UE and corresponds to the macro eNB or RRH. The transmission point for uplink synchronization includes at least one or more antenna ports. For example, the transmission point for uplink transmission may be the macro eNB, including antenna port 0. The antenna port 0 can be used as a reference to other antenna ports. Therefore, the antenna port 0 can be used as a reference for determining a transmission offset. The transmission offset corresponds to an offset in the time and/or frequency domain and a method for determining a transmission offset follows what are described above. For example, the UE can determine a transmission offset according to whether a transmission offset corresponds to macro eNB or RRH and determine the transmission offset such that individual RRHs have offsets different from each other.

The UE allocates an uplink synchronization signal to a second communication channel based on the transmission offset determined S1720. The UE transmits the uplink synchronization signal to the transmission point for uplink synchronization through the second communication channel S1730. In other words, the second communication channel is used for transmission of uplink synchronization signal. For example, the second communication channel may correspond to the PRACH in the LTE-A system. At this time, the UE can transmit a uplink synchronization signal by using transmission power determined based on path loss between the UE and the transmission point for uplink synchronization. In other words, the uplink synchronization signal is determined based on path loss between the UE and the transmission point for uplink synchronization. The path loss can be obtained based on the CRS and/or CSI-RS transmitted from a plurality of transmission points.

Figure 18:
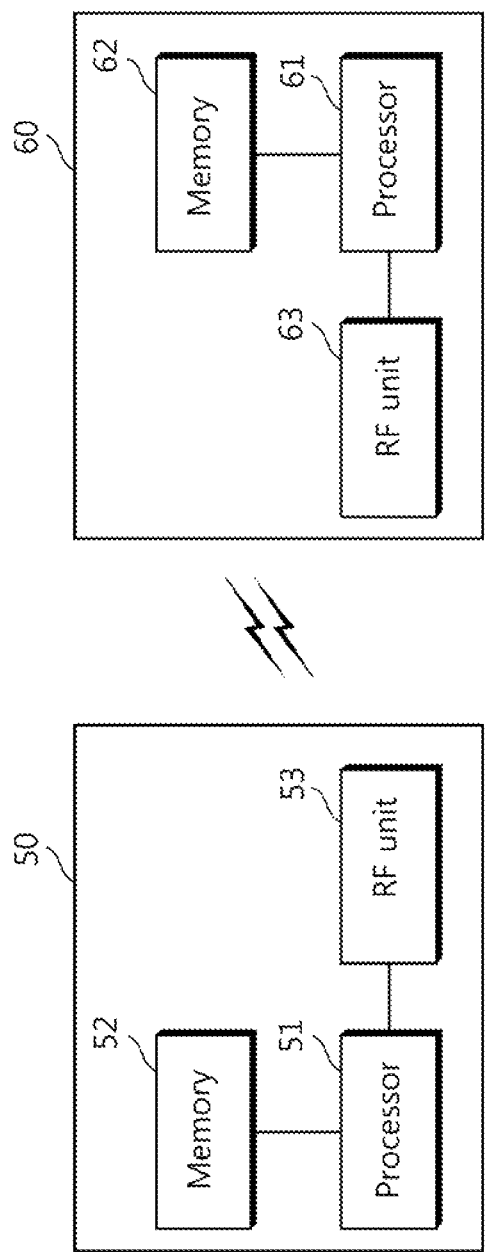
FIG. 18 illustrates a wireless communication system in which an embodiment of the present invention is implemented.

FIG. 18 illustrates a wireless communication system in which an embodiment of the present invention is implemented.

A base station 50 comprises a processor 51, a memory 52, and an RF (Radio Frequency) unit 53. The memory 52, being connected to the processor 51, stores various pieces of information needed for operating the processor 51. The RF unit 53, being connected to the processor 51, transmits and/or receives radio signals. The processor 51 implements proposed functions, procedures, and/or methods. Operation of the base station in the embodiment described above can be realized by the processor 51.

A wireless device 60 comprises a processor 61, a memory 62, and an RF unit 63. The memory 62, being connected to the processor 61, stores various pieces of information needed for operating the processor 61. The RF unit 63, being connected to the processor 61, transmits and/or receives radio signals. The processor 61 implements proposed functions, procedures, and/or methods. Operation of the user equipment in the embodiment described above can be realized by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

What is claimed is:

1. A method for downlink synchronization by a base station having a distributed antenna system that includes base station antennas that are distributed at various positions within a cell, the method comprising:
   determining, by the base station, a transmission offset based on a transmission point of the distributed antenna system from which a downlink synchronization signal is to be transmitted by the base station, the transmission offset being a time and frequency offset that is determined based on antenna port 0 of a macro evolved-NodeB (eNB), the transmission point being selected from the group consisting of the macro eNB and at least two RRHs (Remote Radio Heads) of the distributed antenna system, the transmission offset for individual RRHs of the at least two RRHs being different from each other so as to avoid interference between the at least two RRHs;
   allocating, by the base station, the downlink synchronization signal to a Physical Broadcasting Channel (PBCH) of the distributed antenna system based on the determined transmission offset; and
   transmitting, by the base station via the PBCH of the distributed antenna system, the downlink synchronization signal to a user equipment.

2. The method of claim 1, wherein the PBCH is a PBCH of a LTE (Long Term Evolution)-Advanced system.

3. A method for uplink synchronization by a user equipment with a base station having a distributed antenna system that includes base station antennas that are distributed at various positions within a cell, the method comprising:
   determining, by the user equipment, a transmission offset for the uplink synchronization, the transmission offset being based on a transmission point of the distributed antenna system and corresponding to a downlink synchronization signal, the transmission offset being a time and frequency offset that is determined based on antenna port 0 of a macro evolved-NodeB (eNB), the transmission point being selected from the group consisting of the macro eNB and at least two RRHs (Remote Radio Heads) of the distributed antenna system, the transmission offset for individual RRHs of the at least two RRHs being different from each other so as to avoid interference between the at least two RRHs;
   allocating, by the user equipment based on the determined transmission offset, an uplink synchronization signal to a Physical Random Access Channel (PRACH) for the uplink synchronization; and
   transmitting, by the user equipment, the uplink synchronization signal to the transmission point of the distributed antenna system through the PRACH.

4. The method of claim 3, wherein the transmission point is determined by the base station.

5. The method of claim 3, wherein the transmission point is determined based on measurement by the user equipment.

6. The method of claim 3, wherein the PRACH is a PRACH of a LTE (Long Term Evolution)-Advanced system.

7. The method of claim 3, wherein the uplink synchronization signal is transmitted by using a transmission power determined based on a path loss between the user equipment and the transmission point.

8. The method of claim 7, wherein the path loss is obtained based on a CSI-RS (Channel State Information-Reference Signal) transmitted from each of a plurality of transmission points.

9. A user equipment configured for uplink synchronization with a base station having a distributed antenna system that includes base station antennas that are distributed at various positions within a cell, the user equipment comprising:
   a RF (Radio Frequency) unit configured to transmit and receive radio signals; and
   a processor connected to the RF unit and configured to
      determine a transmission offset for the uplink synchronization, the transmission offset being based on a transmission point of the distributed antenna system and corresponding to a downlink synchronization signal, the transmission offset being a time and frequency offset that is determined based on antenna port 0 of a macro evolved-NodeB (eNB), the transmission point being selected from the group consisting of the macro eNB and at least two RRHs (Remote Radio Heads) of the distributed antenna system, the transmission offset for individual RRHs of the at least two RRHs being different from each other so as to avoid interference between the at least two RRHs;
      based on the determined transmission offset, allocate an uplink synchronization signal to a Physical Random Access Channel (PRACH) for the uplink synchronization; and
      transmit the uplink synchronization signal to the transmission point of the distributed antenna system through the PRACH.

10. The user equipment of claim 9, wherein transmission offset differs based on whether the transmission point is the macro eNB or the at least two RRHs.

11. The user equipment of claim 9, wherein the PRACH is a PRACH of a LTE (Long Term Evolution)-Advanced system.

12. The user equipment of claim 9, wherein the uplink synchronization signal is transmitted by using a transmission power determined based on a path loss between the user equipment and the transmission point.

* * * * *